(12) United States Patent
Yokonuma

(10) Patent No.: US 6,359,651 B1
(45) Date of Patent: Mar. 19, 2002

(54) ELECTRONIC CAMERA USING FLASH FOR EXPOSURE CONTROL

(75) Inventor: Norikazu Yokonuma, Adachi-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/412,651

(22) Filed: Oct. 5, 1999

(30) Foreign Application Priority Data

Oct. 6, 1998 (JP) .......................................... 10-284540
Oct. 6, 1998 (JP) .......................................... 10-284541

(51) Int. Cl.[7] .......................... H04N 5/235; H04N 3/14; G03B 9/70
(52) U.S. Cl. ....................... 348/370; 348/229; 348/296; 396/166
(58) Field of Search ................................. 348/370, 371, 348/65, 68, 69, 222, 225, 362–366, 229, 296; 396/166, 155–169, 106; 600/160, 180; 382/162, 167; 358/518

(56) References Cited

U.S. PATENT DOCUMENTS

| | | | | |
|---|---|---|---|---|
| 4,561,429 A | * | 12/1985 | Sato et al. ..................... 348/65 |
| 5,331,949 A | * | 7/1994 | Funakoshi et al. ............. 348/69 |
| 5,539,523 A | * | 7/1996 | Nakai et al. ................. 358/518 |
| 5,751,348 A | * | 5/1998 | Inuiya et al. ................ 348/220 |
| 5,831,676 A | * | 11/1998 | Takahashi et al. ........... 348/229 |
| 6,256,067 B1 | * | 7/2001 | Yamada ....................... 348/370 |
| 6,278,490 B1 | * | 8/2001 | Fukuda et al. .............. 348/370 |

* cited by examiner

*Primary Examiner*—Wendy R. Garber
*Assistant Examiner*—Rashawn N Tillery
(74) *Attorney, Agent, or Firm*—Oliff & Berridge, PLC

(57) ABSTRACT

A camera CPU internally provided at a digital still camera determines an exposure time based upon an image signal input from a CCD via a control circuit. The camera CPU also implements preliminary photographing which is accompanied by light emission by an electronic flash unit, obtains a light emission quantity at the electronic flash unit for main photographing based upon the results of preliminary photographing and determines the flash time using the light emission quantity. If the flash time is longer than the exposure time, the camera CPU reduces the length of flash time. The camera CPU calculates the quantity of underexposure occurring as a result of the exposure ending before the illumination by the electronic flash unit is completed. An image processing circuit engages in color correction by incorporating the quantity of underexposure that has been calculated in advance when it processes image data obtained through an imaging operation.

21 Claims, 12 Drawing Sheets

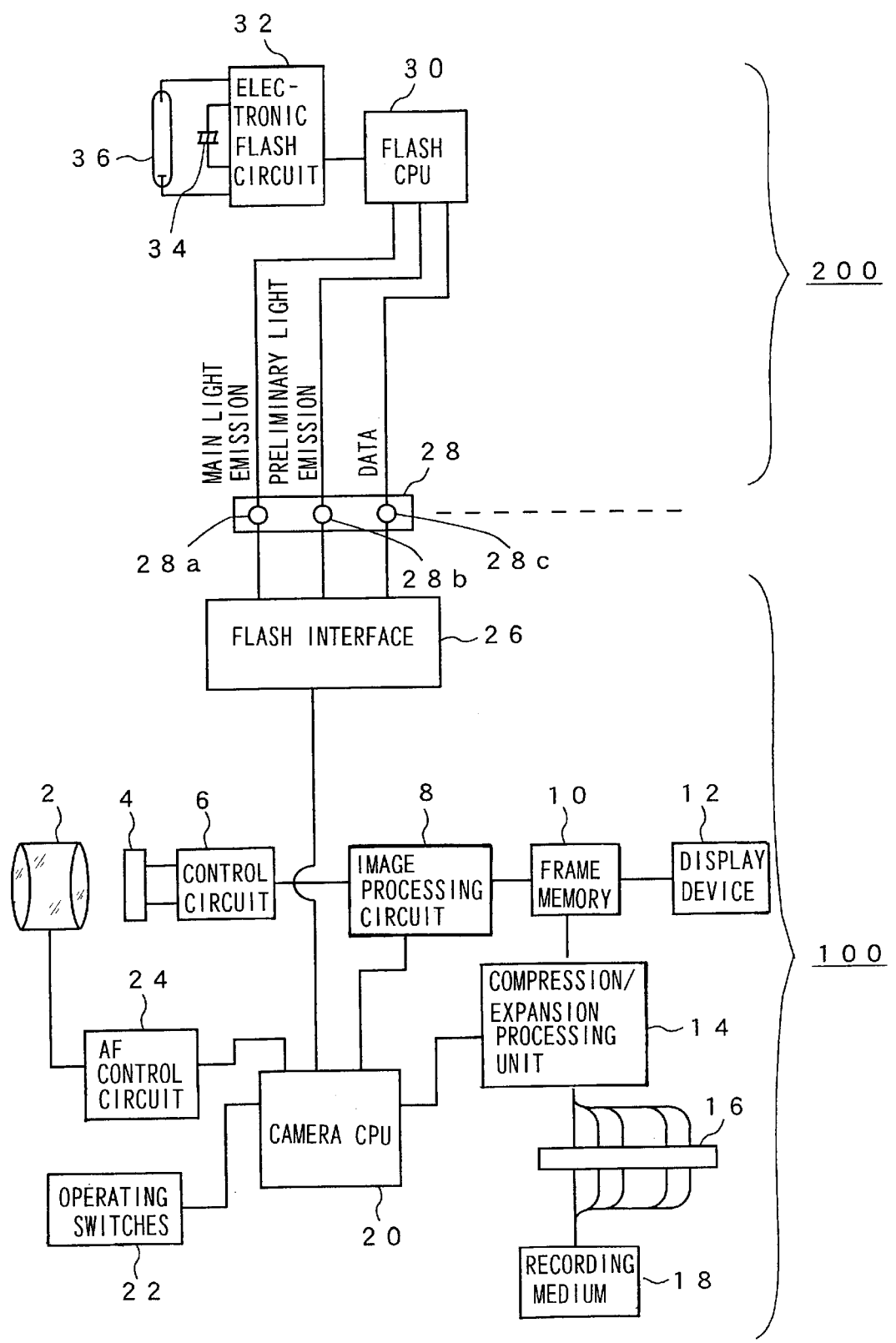

ELECTRONIC CAMERA USING FLASH FOR EXPOSURE CONTROL

INCORPORATION BY REFERENCE

The disclosures of the following priority applications are herein incorporated by reference:

Japanese Patent Application No. 10-284540 filed Oct. 6, 1998.

Japanese Patent Application No. 10-284541 filed Oct. 6, 1998.

BACKGROUND OF THE INVENTION

1. Field of the Invention

The present invention relates to an electronic camera, and more specifically, it relates to an electronic camera which is capable of achieving color reproduction with a high degree of fidelity through flash photographing.

2. Description of the Related Art

Electronic cameras in the prior art include digital still cameras (hereafter in this specification, a "digital still camera" is referred to as a "DSC" in abbreviation). A DSC employs a solid imaging device such as a CCD or a CMOS sensor to capture an image of the image formed through a taking lens, i.e., performs A/D conversion on image data obtained through photoelectric conversion, compresses the data using an image compression algorithm such as JPEG as necessary and records the data in a non-volatile data storage device.

During the image-capturing operation described above, the exposure time at the solid imaging device is controlled by an electronic shutter. Namely, the exposure time is controlled by controlling the storage time at the solid imaging device instead of by opening/closing a mechanical shutter as in a camera that uses silver halide film (photographic film). As a result, high speed exposure times such as 1/4000 sec or 1/8000 sec can be realized with relative ease.

When taking a picture under back lighted conditions, e.g., when photographing a person standing in the shade of a tree against a background of ocean reflecting the sun, the difference between the brightness of the background and the brightness of the main subject, i.e., the person, is great and it is, therefore, difficult to perform photographing while achieving good exposure for both the background and the subject. In order to deal with this problem, a photographing method called the fill-flash photographing method has been proposed, whereby the shutter speed and the aperture are set so as to achieve the correct exposure for the background and compensating for the underexposure of the main subject by providing fill-in flash using an electronic flash unit.

However, when using fill-in flash as described above with a DSC, there may arise a situation in which the flash time at the electronic flash unit is approximately 1 msec while the shutter speed, i.e., the exposure time is set at a very small value of less than 1/1000 sec, depending upon the brightness of the background, the photographing distance from the camera to the main subject or the like. In such a case, the exposure ends before the light emission by the electronic flash unit is completed, which then results in lowered image quality due to underexposure of the main subject. In addition, it is a wasteful use of light emission energy for the electronic flash unit to keep emitting light even after the solid imaging device finishes exposure. Furthermore, if the electronic flash unit keeps emitting light even after the solid imaging device, finishes exposure and starts transfer of the electrical charge stored at the individual pixels at the solid imaging device, light that has been strongly reflected by a bright surface or the like in the subject may enter the charge vertical transfer unit of the solid imaging device to induce smearing, which will result in a poor image quality.

SUMMARY OF THE INVENTION

A first object of the present invention is to provide an electronic camera that makes it possible to prevent any reduction in the image quality occurring due to underexposure of the subject irradiated by an electronic flash unit even when the flash time is longer than the exposure time during a flash photographing operation.

A second object of the present invention is to provide an electronic camera that is capable of eliminating wasteful use of light emission energy at the electronic flash unit and preventing occurrence of smearing even when the flash time is longer than the exposure time during a flash photographing operation.

In order to achieve the objects described above, the electronic camera according to the present invention comprises an imaging device that performs photoelectric conversion of an image formed by a taking lens and outputs an image signal, an exposure time determination unit that determines the length of exposure time at the imaging device based upon the brightness of the subject, a light emission quantity control unit that controls the quantity of light emission by adjusting the length of flash time at an electronic flash unit when performing photographing using the electronic flash unit, an arithmetic operation unit that calculates the quantity of underexposure occurring when the length of flash time is longer than the exposure time and the exposure of the subject illuminated by the electronic flash unit is interrupted in the middle because of the shorter exposure time and a signal processing unit that generates image data by amplifying the image signal output by the imaging device at a specific gain and performed image processing by incorporating the quantity of underexposure calculated at the arithmetic operation unit at least either when engaging in gain adjustment or when engaging in color correction for image processing.

The present invention is further provided with a data table in which processing parameters corresponding to quantities of underexposure are stored, and the signal processing unit performs image processing based upon the processing parameters read out from the data table in correspondence to a given quantity of underexposure.

In addition, according to the present invention, the signal processing unit separates the image of the background from the image of the main subject and performs color correction in correspondence to the background and the main subject individually.

The electronic camera according to the present invention comprises an imaging device that performs photoelectric conversion of an image formed by a taking lens and outputs an image signal, an exposure time determination unit that determines the length of exposure time at the imaging device based upon the brightness of the subject, a light emission quantity control unit that controls the quantity of light emission by adjusting the length of flash time at an electronic flash unit when performing photographing using the electronic flash unit, and an exposure quantity control unit that ensures that the flash operation performed by the electronic flash unit is completed within the exposure time by reducing the length of flash time when the flash time is longer than the exposure time.

The present invention may further comprise a signal processing unit that engages in image processing on image data generated by amplifying the image signal output by the imaging device at a specific gain and an arithmetic operation unit that calculates the quantity of underexposure occurring as a result of the reduction in the flash time effected by the light emission quantity control unit. The signal processing unit uses the quantity of underexposure calculated at the arithmetic operation unit to engage in at least either gain adjustment or color correction through image processing.

The present invention is further provided with a data table in which processing parameters corresponding to quantities of underexposure are stored, and the signal processing unit performs image processing based upon the processing parameter read out from the data table in correspondence to a given quantity of underexposure.

In addition, according to the present invention, the signal processing unit separates the image of the background from the image of the main subject and performs color correction in correspondence to the background and the main subject individually.

The electronic camera according to the present invention comprises an imaging device that performs photoelectric conversion of an image formed by a taking lens and outputs an image signal, an exposure time determination unit that determines the length of exposure time at the imaging device based upon the brightness of the subject, a light emission quantity control unit that controls the quantity of light emission by adjusting the length of flash time at an electronic flash unit when performing photographing using the electronic flash unit, and an exposure quantity control unit that sets the exposure time roughly equal to the flash time by extending the exposure time when the flash time is longer than the exposure time.

The present invention further comprises a signal processing unit that engages in image processing on image data generated by amplifying the image signal output by the imaging device at a specific gain and an arithmetic operation unit that calculates the quantity of overexposure occurring as a result of the extension of the exposure time effected by the exposure quantity control unit. The signal processing unit uses the quantity of overexposure calculated at the arithmetic operation unit to engage in at least either gain adjustment or color correction through image processing.

The present invention is further provided with a data table in which processing parameters corresponding to quantities of overexposure are stored, and the signal processing unit performs image processing based upon the processing parameter read out from the data table in correspondence to a given quantity of overexposure.

In addition, according to the present invention, the signal processing unit separates the image of the background from the image of the main subject and performs color correction in correspondence to the background and the main subject individually.

Alternatively, the electronic camera according to the present invention may comprise an imaging device that performs photoelectric conversion of an image formed by a taking lens and outputs an image signal, an exposure time determination unit that determines the length of exposure time at the imaging device based upon the brightness of the subject, a light emission quantity control unit that controls the quantity of light emission by adjusting the length of flash time at an electronic flash unit when performing photographing using the electronic flash unit and a photographing operation prohibiting unit that prohibits a photographing operation if the flash time is longer than the exposure time.

As a further alternative, the electronic camera according to the present invention may comprise an imaging device that performs photoelectric conversion of an image formed by a taking lens and outputs an image signal, an exposure time determination unit that determines the length of exposure time at the imaging device based upon the brightness of the subject, a light emission quantity control unit that controls the quantity of light emission by adjusting the length of flash time at an electronic flash unit when performing photographing using the electronic flash unit, and a warning unit that transmits a warning if the flash time is longer than the exposure time.

In addition, the present invention is further provided with an light emission quantity control unit that ensures that the flashing operation performed by the electronic flash unit is completed within the exposure time by shortening the flash time if it is detected that a release operation has been performed after a warning is issued by the warning unit.

The present invention further comprises a signal processing unit that engages in image processing on image data generated by amplifying the image signal output by the imaging device at a specific gain and an arithmetic operation unit that calculates the quantity of underexposure occurring as a result of the reduction in the flash time effected by the light emission quantity control unit. The signal processing unit uses the quantity of underexposure calculated at the arithmetic operation unit to engage in at least either gain adjustment or color correction through image processing.

The present invention is further provided with a data table in which processing parameters corresponding to quantities of underexposure are stored, and the signal processing unit performs image processing based upon the processing parameters read out from the data table in correspondence to a given quantity of underexposure.

In addition, according to the present invention, the signal processing unit separates the image of the background from the image of the main subject and performs color correction in correspondence to the background and the main subject individually.

Alternatively, the present invention may further comprise an exposure quantity control unit that sets the exposure time roughly equal to the length of the flash time by extending the exposure time if it is detected that a release operation has been performed after a warning has been issued by the warning unit.

The present invention further comprises a signal processing unit that engages in image processing on image data generated by amplifying the image signal output by the imaging device at a specific gain and an arithmetic operation unit that calculates the quantity of overexposure occurring as a result of the extension of the exposure time effected by the exposure quantity control unit. The signal processing unit uses the quantity of overexposure calculated at the arithmetic operation unit to engage in at least either gain adjustment or color correction through image processing.

The present invention is further provided with a data table in which processing parameters corresponding to quantities of overexposure are stored, and the signal processing unit performs image processing based upon the processing parameters read out from the data table in correspondence to a given quantity of overexposure.

In addition, according to the present invention, the signal processing unit separates the image of the background from the image of the main subject and performs color correction in correspondence to the background and the main subject individually.

BRIEF DESCRIPTION OF THE DRAWINGS

FIG. 1 illustrates schematic structures of the electronic camera in first through third embodiments of the present invention and the electronic flash unit mounted at the electronic camera;

DESCRIPTION OF THE PREFERRED EMBODIMENTS

First Embodiment

Figure 2A:
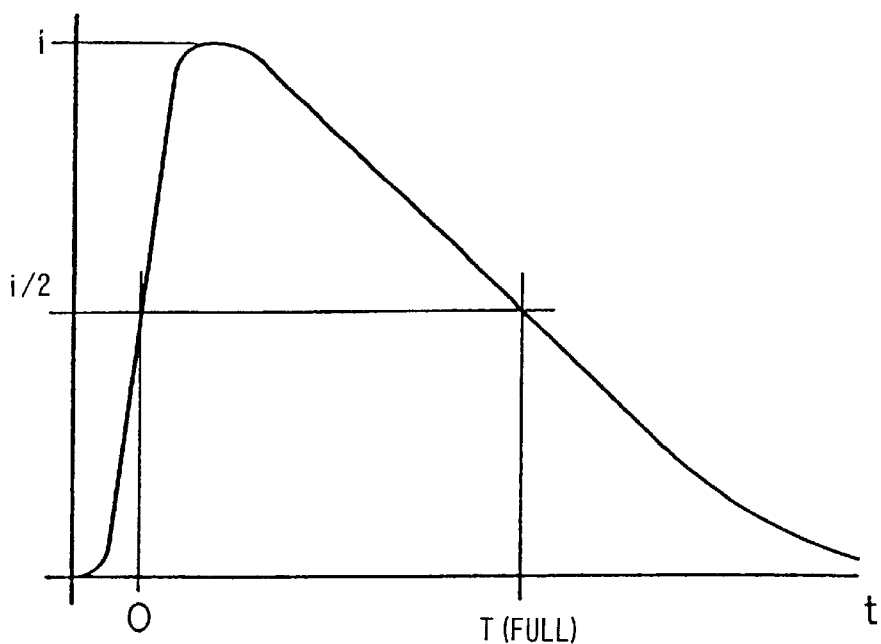
FIG. 2A presents a waveform of light emitted by the electronic flash unit to illustrate the length of time over which light is emitted when the electronic flash unit engages in full light emission.

FIG. 1 illustrates an example of the present invention adopted in a DSC 100 at which an electronic flash unit 200 can be attached or detached, and shows schematic structures of the DSC 100 and the electronic flash unit 200.

Internal Structure of the DSC

The following is an explanation of the internal structure of the DSC 100. Operating switches 22 comprising a power switch, a mode setting switch, a reproduction frame specifying switch, a shutter release switch and the like (not shown) are connected to a camera CPU 20 that controls the photographing sequence for the entire DSC. In response to an operation of the operating switches 22 by the photographer, the camera CPU 20 controls the operation of the DSC 100.

The focusing drive of a taking lens 2 which is interchangeably mounted at the DSC 100 to suit specific purposes of photographing is controlled by an AF control circuit 24 based upon the information on the focal position of the taking lens 2 detected by a TTL phase difference detection-type focal point detection unit (not shown) connected to the AF control circuit 24. It is to be noted that the AF control circuit 24 may employ either an active rangefinder that projects infrared light or the like toward the subject or a passive rangefinder that measures the range by detecting the quantities of offset among subject images formed by a plurality of image forming lenses provided over specific intervals in a direction perpendicular to the optical axis. Alternatively, it may adopt the contrast detection method whereby the change in contrast at the subject image is detected based upon an image signal output by a CCD 4 which is to be detailed later while driving the taking lens 2 back and forth and the taking lens 2 is stopped at the position at which the value representing contrast achieves its highest point.

A subject image is formed by the taking lens 2 at the light-receiving surface of the CCD 4. The CCD 4 outputs an image signal generated based upon the subject image to a control circuit 6, which is connected to the CCD 4. The control circuit 6 outputs subject brightness information obtained based upon the image signal input from the CCD 4 to the camera CPU 20. The camera CPU 20 determines the length of time elapsing from the start of a storage operation at the CCD 4 until the end of the storage operation as detailed later based upon the signal and outputs a control signal to the control circuit 6. Hereafter in this specification, the storage operation start and the storage operation end at the CCD 4 are respectively referred to as an "exposure start" and an "exposure end," and the length of time elapsing between the storage operation start and the storage operation end is referred to as the "shutter speed" or the "exposure time." The control circuit 6 implements control of the exposure start and the exposure end for the CCD 4 based upon the control signal output by the camera CPU 20, and it also performs A/D conversion by amplifying the image signal output by the CCD 4 at a specific gain and outputs converted data to an image processing circuit 8.

The image processing circuit 8 performs processing such as color correction on the image signal output by the control circuit 6 and outputs the processed data to a frame memory 10 connected to the image processing circuit 8. Through the operation described above, the data corresponding to the image captured at the CCD 4 are temporarily recorded in the frame memory 10, and an image corresponding to the image data is displayed on a display device 12.

A compression/expansion processing unit 14 that compresses/expands the image data based upon an image data compression algorithm such as JPEG is connected to the frame memory 10. In addition, a recording medium 18 is connected to the frame memory 10 via a connector 16. The image data that have undergone compression processing at the compression/expansion processing unit 14 are sequentially transferred to the recording medium 18. The recording medium 18 should be constituted of a non-volatile storage device (which does not require electric power for holding information) such as a flash memory, sometimes called as Compact Flash (CF) card, Smart Media card, or the like, and should be detachable via the connector 16.

The processing and recording of image signals and image data performed by the control circuit 6, the image processing circuit 8, the frame memory 10, the compression/expansion processing unit 14 and the recording medium 18 explained above, the transfer of image signals and image data performed among these components and the display of an image corresponding to the image data temporarily recorded in the frame memory 10 on the display unit 12 are all controlled by the camera CPU 20.

A flash interface 26 is connected to the camera CPU 20 to allow transmission and reception of control signals and status signals between the camera CPU 20 and the electronic flash unit 200. The DSC 100 and the electronic flash unit 200 are electrically connected with each other via a connector 28.

Internal Structure of the Electronic Flash Unit

The electronic flash unit 200 is internally provided with an electronic flash circuit 32 that controls an electrical charge of a main condenser 34 at which the light emission energy, i.e., the electrical charge to be discharged through a flashtube 36 and controls the quantity of discharge, i.e., the quantity of emitted light, through the flashtube 36. In addition, the electronic flash unit 200 is internally provided with a flash CPU 30 that controls the operation of the electronic flash unit 200 and enables transmission and reception of control signals and status signals between the electronic flash unit 200 and the DSC 100.

As detailed later, the flash CPU 30 engages in bi-directional communication with the camera CPU 20 via a terminal 28c of the connector 28. In addition, it implements control of the light emission by the electronic flash circuit 32 in response to a main light emission command signal or a preliminary light emission command signal issued by the camera CPU 20 via a terminal 28a or a terminal 28b.

Figure 2B:
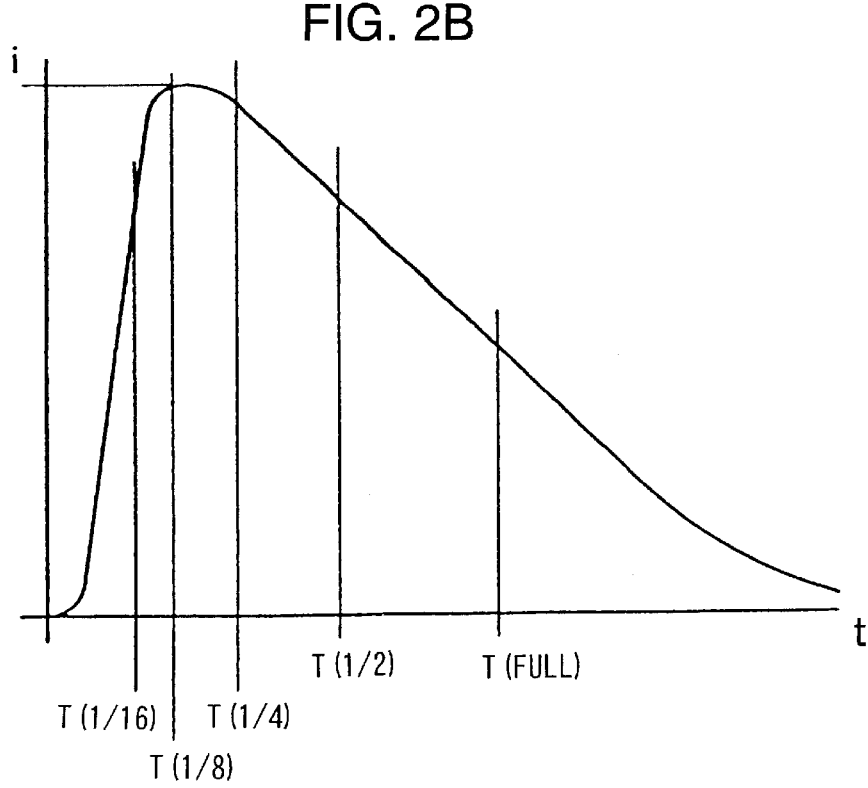
FIG. 2B presents the waveform of light emitted by the electronic flash unit to illustrate the relationship between the flash time and the quantity of light emission.

The following is an explanation of the method for controlling the quantity of light emission at the electronic flash unit, given in reference to FIG. 2 which presents a standard waveform of light emitted by the electronic flash unit. FIGS. 2A and 2B, in both of which the horizontal axis represents time and the vertical axis represents the intensity of light emitted by the electronic flash unit, illustrate the change in the intensity of emitted light occurring after the start of a light emission until the end of the light emission at the electronic flash unit.

As illustrated in FIGS. 2A and 2B, the intensity of light emitted by the electronic flash unit reaches a peak value i within a short period after the start of a light emission, and subsequently becomes lowered relatively slowly. In FIGS. 2A and 2B, the area enclosed by the curve representing the intensity of light emitted and the X axis (the axis representing time) indicates the total light emission quantity, i.e., the accumulated light emission quantity. As illustrated in FIG. 2A, after the electronic flash unit starts light emission and the intensity of light emitted reaches the peak value i, the total light emission quantity becomes almost equal to the total light emission quantity during a full light emission at a point in time at which the intensity has fallen to a intensity of light emitted i/2 which is half of the peak value i. This is hereafter referred to as the flash time of a full light emission. The flash time of a full light emission in a clip-on compact electronic flash unit which may be mounted at an accessory shoe of the camera is normally approximately 1 millisecond.

The light emission quantity at the electronic flash unit, i.e., the accumulated quantity of light emitted after the start of the light emission to the end of the light emission can be controlled by controlling the flash time, as illustrated in FIG. 2B. This point is now explained in reference to the DSC 100 (see FIG. 1) in the embodiment. A flash time $T(\frac{1}{2})$, $T(\frac{1}{4})$, $T(\frac{1}{8})$, $T(\frac{1}{16})$, . . . at which the light emission quantities at the electronic flash unit are $\frac{1}{2}$, $\frac{1}{4}$, $\frac{1}{8}$, $\frac{1}{16}$, . . . , respectively of the light emission quantity during a full light emission are obtained in advance through tests, and they are used to constitute a database which may then be recorded in memory within the camera CPU 20. The camera CPU 20 determines the light emission quantity at the electronic flash unit 200 through the procedure to be detailed later, and the flash time that is to be used during this operation can be obtained from the database mentioned above.

The light emission quantity at the electronic flash unit, i.e., the so-called guide number, varies from one electronic flash unit model to another. This point is now explained in reference to the light emission waveform in FIG. 2A. The peak value i of the intensity of light emitted and the flash time of a full light emission vary among different electronic flash unit models. However, the light emission waveforms achieved in different models are similar to one another. Thus, as long as the flash time during a full emission can be obtained, the light emission times over which the light emission quantities that are $\frac{1}{2}$, $\frac{1}{4}$, . . . , of a full light emission, for instance, can be calculated easily.

To explain this point in more specific terms, the camera CPU 20 of the DSC 100 in the embodiment inputs the flash time of a full light emission at the electronic flash unit 200 that is mounted at the DSC 100 when it has engaged in communication with the flash CPU 30. Then, it transmits information concerning the light emission quantity, i.e., information indicating what fraction of a full light emission is to be implemented, to the flash CPU 30, as explained later, to control the light emission quantity at the electronic flash unit 200. For this operation, the flash time at the electronic flash unit 200 may be obtained in advance by the camera CPU 20 by performing a proportional calculation on the light emission time obtained from the database mentioned earlier.

It is to be noted that the light emission quantity at the electronic flash unit 200 may be controlled by the camera CPU 20 by sending the information related to the flash time to the flash CPU 30, instead. Alternatively, the camera CPU 20 may directly control light emission start/light emission stop at the electronic flash unit 200.

Operation of the Camera CPU

As explained above, the DSC 100 in this embodiment of the present invention is not provided with a light-receiving element for implementing the so-called TTL auto-flash control or an optical system which would guide a portion of the subject light to the light-receiving element. Thus, during flash photographing, two photographing operations are performed so that the light emission quantity at the electronic flash unit is determined based upon the results of the first photographing operation, i.e., the preliminary photographing operation to perform the second photographing operation, i.e., the main photographing operation. Since the first flash photographing operation is completed within a fairly short period of time as detailed later during this process, the photographer can perform flash photographing that feels normal. The following is an explanation of the operation of the DSC 100, given in reference to FIGS. 3 and 4 that illustrate the flow of the operation control program for the DSC 100 executed by the camera CPU 20 as well as FIG.

1. It is to be noted that hereafter in this specification, the explanation is given by referring to the first photographing operation as "preliminary photographing" and the second photographing operation as "main photographing."

Figure 3:
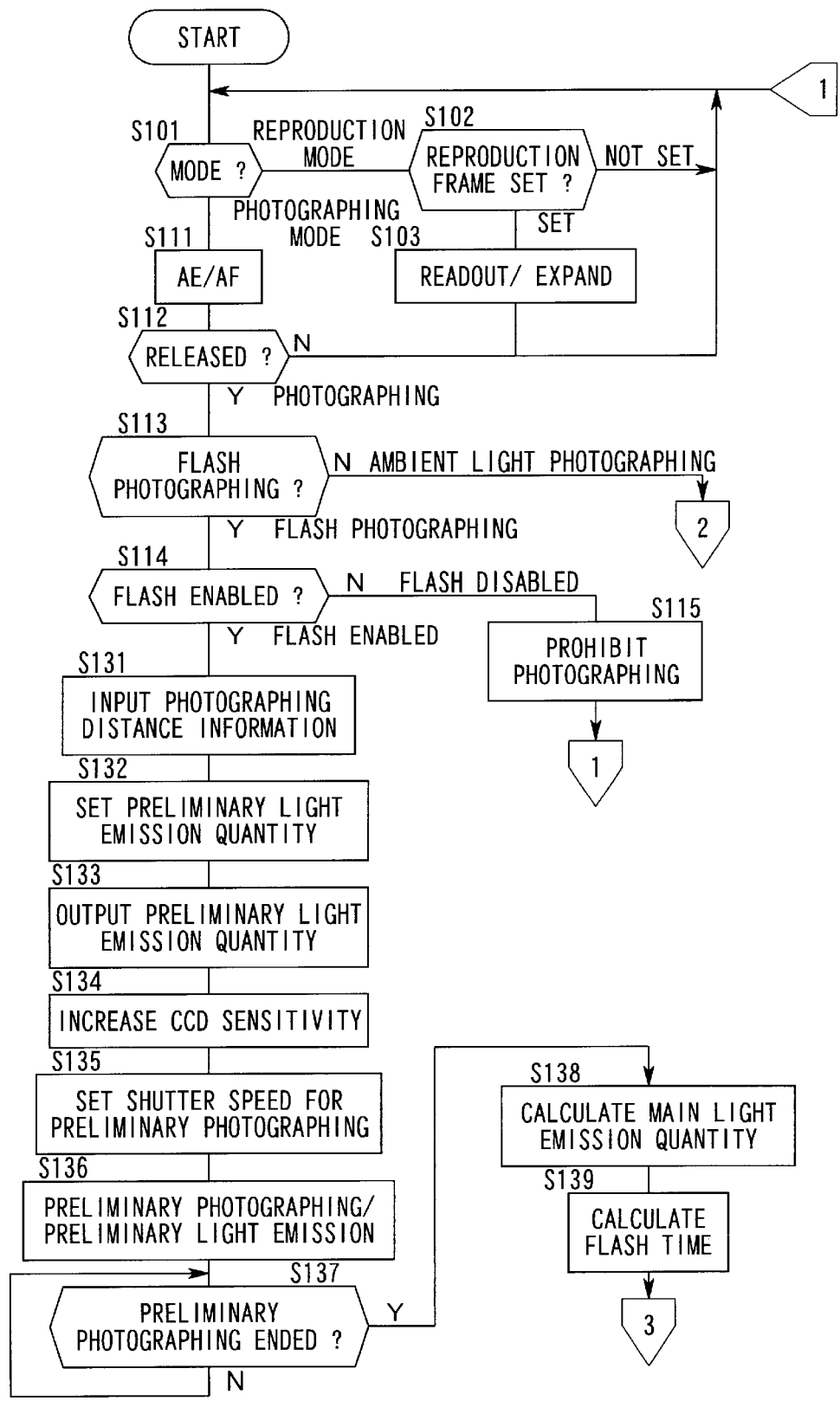
FIG. 3 is a flowchart illustrating the flow of the operation control program for the electronic camera which is executed by the camera CPU internally provided at the electronic camera in the first embodiment.
Figure 4:
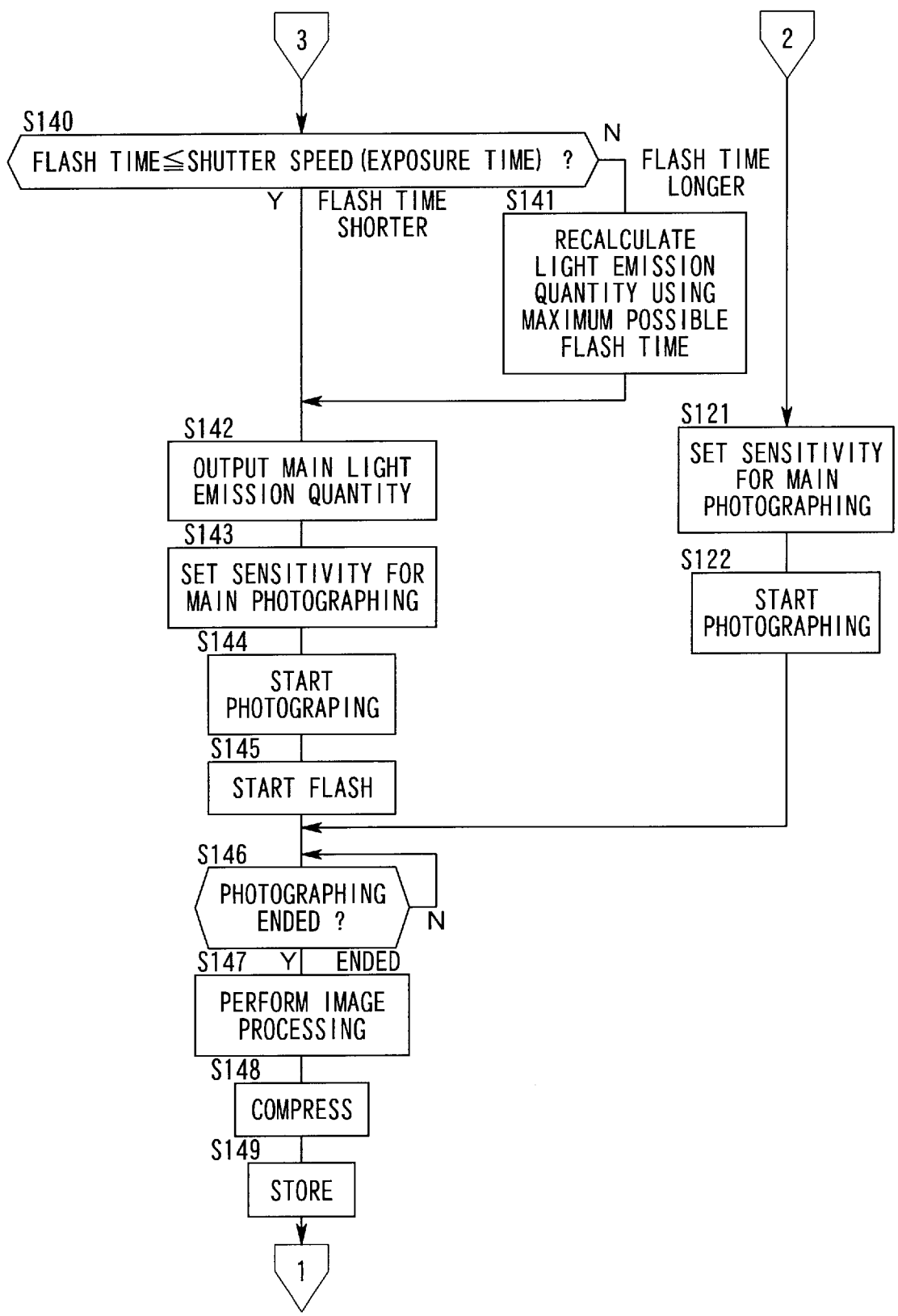
FIG. 4 is a continuation of the flowchart presented in FIG. 3 illustrating the flow of the operation control program for the electronic camera which is executed by the camera CPU internally provided at the electronic camera in the first embodiment.

The execution of the program illustrated in the flowchart in FIGS. 3 and 4 by the camera CPU 20 is initiated by switching the power in the DSC 100 to the ON position. In S101, the camera CPU 20 detects the states of the operating switches 22 to make a decision as to whether the DSC 100 is to operate in a "reproduction mode" or in a "photographing mode." The camera CPU 20 branches to S102 if it is decided that the DSC 100 is to operate in the reproduction mode, whereas it proceeds to S111 to start a photographing operation if it is decided that the DSC 100 is to operate in the photographing mode.

Reproduction Mode

In S102, the camera CPU 20 makes a decision as to whether or not a reproduction frame number has been set by the photographer by operating the reproduction frame specifying switch (not shown) among the operating switches 22, and it returns to S101 if it is decided that no reproduction frame number has been set, whereas it proceeds to S103 if it is decided that a reproduction frame number has been set. In S103, the camera CPU 20 transmits a data read command to the compression/expansion processing unit 14. The compression/expansion processing unit 14 reads the file corresponding to the frame number that has been set from the recording medium 18 and expands it, and then transfers the expanded file to the frame memory 10. An image generated based upon the data transferred to the frame memory 10 is displayed on the display device 12. When the camera CPU 20 completes the processing described above, the operation returns to S101.

Photographing Mode

In S111, the camera CPU 20 engages in an AE (auto exposure)/AF (auto focus) operation as explained below. Namely, the camera CPU 20 transmits a command to the control circuit 6 to obtain the shutter speed, i.e., the exposure time elapsing from exposure start to exposure end at the CCD 4 by inputting subject brightness information from the control circuit 6 before ending the AE operation. The AF operation is automatically performed by an AF control circuit 24 with a control signal transmitted by the camera CPU 20 to the AF control circuit 24, and the focusing drive of the taking lens 2, too, is performed by the AF control circuit 24.

In S112, the camera CPU20 detects the operating states of the operating switches 22 to make a decision as to whether or not a release button (not shown) has been operated, i.e., whether or not the photographer has performed a photographing start operation. If a negative decision is made in S112, the camera CPU 20 branches to S101 to repeat the operation described above, whereas if an affirmative decision is made in S112, the operation proceeds to S113.

In S113, the camera CPU 20 makes a decision as to whether or not flash photographing is to be performed. This determination may be implemented either by detecting the operating states of the operating switches 22 to make a decision as to whether or not the photographer has made the setting for flash photographing or by using the results of the AE operation performed in S111 to decide that flash photographing is to be performed when the subject brightness is lower than a specific value. While the operation branches to S121 if a negative decision is made in S113, the operation proceeds to S114 if an affirmative decision is made in S113.

In S114, the camera CPU 20 engages in communication with the flash CPU 30 via the flash interface 26 to input information. It reads information related to the state of the electrical charge at the main condenser 34 included in the information thus input, to make a decision as to whether or not the electrical charge has been completed or it is still incomplete, i.e., whether or not flash is enabled. If a negative decision is made in S114, the operation branches to S115 to set the DSC 100 in a photographing prohibited state before returning to S101. If, on the other hand, an affirmative decision is made in S114, the operation proceeds to S131.

In S131, the camera CPU 20 inputs photographing distance information from the AF control circuit 24 based upon the results of the AF operation executed in S111. It is to be noted that the photographing distance may be calculated based upon the quantity of the lens-to-image distance if the AF control circuit 24 is constituted by adopting either the contrast detection method or the TTL phase difference detection method.

In S132, the camera CPU 20 sets a preliminary light emission quantity, i.e., the quantity of light emitted by the electronic flash unit 200 in synchronization with the preliminary photographing operation by the DSC 100 based upon the photographing distance information input in S131 and the aperture value set at the taking lens 2. To explain in more specific terms, the camera CPU 20 sets the preliminary light emission quantity in such a manner that the light emission quantity increases if it is detected that the aperture is set on the larger f-number side or if the photographing distance is long.

In S133, the camera CPU 20 engages in communication with the flash CPU 30 via the flash interface 26 and outputs information to the flash CPU 30. This information includes information corresponding to the preliminary light emission quantity calculated in S132, i.e., information indicating rate at which light emission is to be performed relative to the light emission quantity achieved through a full light emission.

In S134, the camera CPU 20 transmits a control signal to the control circuit 6 to set the gain at which the image signal output by the CCD 4 is to be amplified at a level higher than that of the gain appropriate for main photographing and improve the total sensitivity which is obtained as the product of the sensitivity of the CCD 4 itself and the gain of the control circuit 6. Hereafter in this specification, the sensitivity obtained as the product of the sensitivity of the CCD 4 and the gain of the control circuit 6 is referred to as the "effective sensitivity" and the ratio of the gain set in S134 relative to the normal gain is referred to as the "sensitivity ratio." Namely, if the effective sensitivity is doubled by increasing the gain, a sensitivity ratio of 2 is achieved.

In S135, the camera CPU 20 determines the shutter speed for preliminary photographing and then in S136 it transmits an exposure start control signal to the control circuit 6. At this time, the camera CPU 20 sends a preliminary light emission command signal to the electronic flash unit 200 via the flash interface 26. It is to be noted that the shutter speed for the preliminary photographing operation that is determined by the camera CPU 20 in S135 is higher than the shutter speed for the main photographing operation (i.e., the exposure time is shorter), and the reason for this will be explained later.

The camera CPU 20 enters a wait state in S137 until the shutter speed (exposure time) determined in S135 elapses, and when the length of time has elapsed, it sends an exposure end control signal to the control circuit 6. The camera CPU calculates the main light emission quantity, i.e., the light emission quantity for the light emission performed by the electronic flash unit 200 in synchronization with the main photographing operation, based upon the results of the preliminary photographing operation performed in S136~S137. The main light emission quantity calculation is performed through the procedure described below at this time.

The camera CPU 20 obtains a light emission ratio ΔP in S138 based upon the results of the preliminary photographing operation performed in S136~S137. The light emission ratio Δp refers to the ratio of the exposure quantity obtained in the preliminary photographing operation accompanied by the preliminary light emission by the electronic flash unit 200 relative to the correct exposure quantity. In other words, it is a ratio that indicates the multiplication factor by which the light emission quantity during the preliminary light emission should be increased to perform the main light emission to achieve the correct exposure. It is to be noted that the increase in the gain set in S134, i.e., the sensitivity ratio, is not incorporated in the light emission ratio ΔP. In addition, since the gain at the control circuit 6 for the main photographing operation accompanied by the main light emission is set at the normal sensitivity (sensitivity ratio=1) in S143 as is to be detailed later, the main light emission quantity is obtained through the formula given below.

main light emission quantity=preliminary light emission quantity× (sensitivity ratio÷light emission ratio)    formula (1)

When the sensitivity ratio is set to 2 in S134 and the light emission ratio is calculated to be 0.1, for instance, the main light emission quantity is calculated to be; main light emission quantity=preliminary light emission quantity× 2÷0.1=preliminary light emission quantity×20. In other words, the light emission quantity at the electronic flash unit 200 for the main photographing operation should be set at 20 times the light emission quantity for the preliminary photographing operation, in this case.

In S139, the camera CPU 20 obtains the flash time for the main light emission based upon the light emission quantity at the electronic flash unit 200 determined in S138. It is to be noted that since an explanation has already been given as to how the flash time is calculated based upon the light emission quantity at the electronic flash unit, repeated explanation thereof is omitted.

In S140, the camera CPU 20 compares the shutter speed (exposure time) obtained in S111 with the flash time calculated in S139, and the operation proceeds to S142 if it is decided that the flash time is equal to or less than the shutter speed. If, on the other hand, it is decided that the flash time is longer than the exposure time, the camera CPU 20 branches out to S141 in which it recalculates the maximum light emission quantity at which the electronic flash unit 200 is capable of emitting light during the exposure time before proceeding to S142. At this time, the shorter flash time results in an insufficient light quantity, i.e., underexposure, and the camera CPU 20 calculates and stores in memory the underexposure quantity in S141.

In S142, the camera CPU 20 outputs the information regarding the light emission quantity obtained in S138~S141 to the electronic flash unit 200 via the flash interface 26.

In S143, the camera CPU 20 sends a control signal to the control circuit 6 and sets the gain at which the image signal output by the CCD 4 is to be amplified to a level of gain suited for the main photographing operation (sensitivity ratio=1).

In S144, the camera CPU 20 sends a control signal for an exposure start to the control circuit 6, and then in S145, it transmits a flash command to the electronic flash unit 200 via the flash interface 26.

The camera CPU 20 enters a wait state in S146 until the shutter speed (exposure time) obtained in S111 elapses. When the length of time has elapsed, it sends an exposure end control signal to the control circuit 6.

While the control flows for the preliminary photographing operation and the main photographing operation achieved by the camera CPU 20 during flash photographing is explained above, the camera CPU 20 implements main photographing without engaging in preliminary photographing if a negative decision is made in S113. Namely, the camera CPU 20 sends a control signal to the control circuit 6 in S121, sets the gain at which the image signal output by the CCD 4 is to be amplified to a level of gain suitable for the main photographing operation (sensitivity ratio=1), and then sends a control signal for an exposure start to the control circuit 6 in S122 before proceeding to S146.

The camera CPU 20 implements control for the reproduction operation or the photographing operation of the DSC 100 as described above, and when the control for the photographing operation has been implemented, it engages in control of image processing, data compression, data recording and the like in S147 and subsequent steps as explained below.

In S147, the camera CPU 20 performs image processing as described below. Namely, the camera CPU 20 sends an image signal read control signal to the control circuit 6, and in response, the control circuit 6 inputs the image signal from the CCD 4. After amplifying the image signal input from the CCD 4 at the gain set by the camera CPU 20 in S121 or S143, the control circuit 6 performs A/D conversion and outputs the results to the image processing circuit 8. The camera CPU 20 sends an image processing control signal to the image processing circuit 8. If the camera CPU 20 is in the process of executing the processing in S141 during the photographing operation described above, i.e., if underexposure has occurred, the camera CPU 20 outputs the information in regard to the underexposure quantity calculated in S141 to the image processing circuit 8. The image processing circuit 8, which implements color correction by adjusting the gradation, the saturation, the contrast and the like, engages in color correction based upon the information on the underexposure quantity input by the camera CPU 20 at this time to achieve color reproduction with a high degree of fidelity. The image data that have been processed at the image processing circuit 8 as described above are temporarily recorded in the frame memory 10.

In response to the control signal sent by the camera CPU 20 to the compression/expansion processing unit 14 in S148, the compression/expansion processing unit 14 compresses the image data in the frame memory 10 in conformance to an image compression algorithm such as JPEG, and records the compressed image data in the recording medium 18 in S149.

When the processing described above is completed, the camera CPU 20 returns to S101 again to await the next operation by the photographer. It is to be noted that while the explanation is given above on the embodiment in which the image data obtained through preliminary photographing are not recorded in the recording medium 18 and only the image data obtained through main photographing are recorded in the recording medium 18, the image data obtained through preliminary photographing, too, may be recorded in the recording medium 18.

Operation of the Flash CPU

Figure 5:
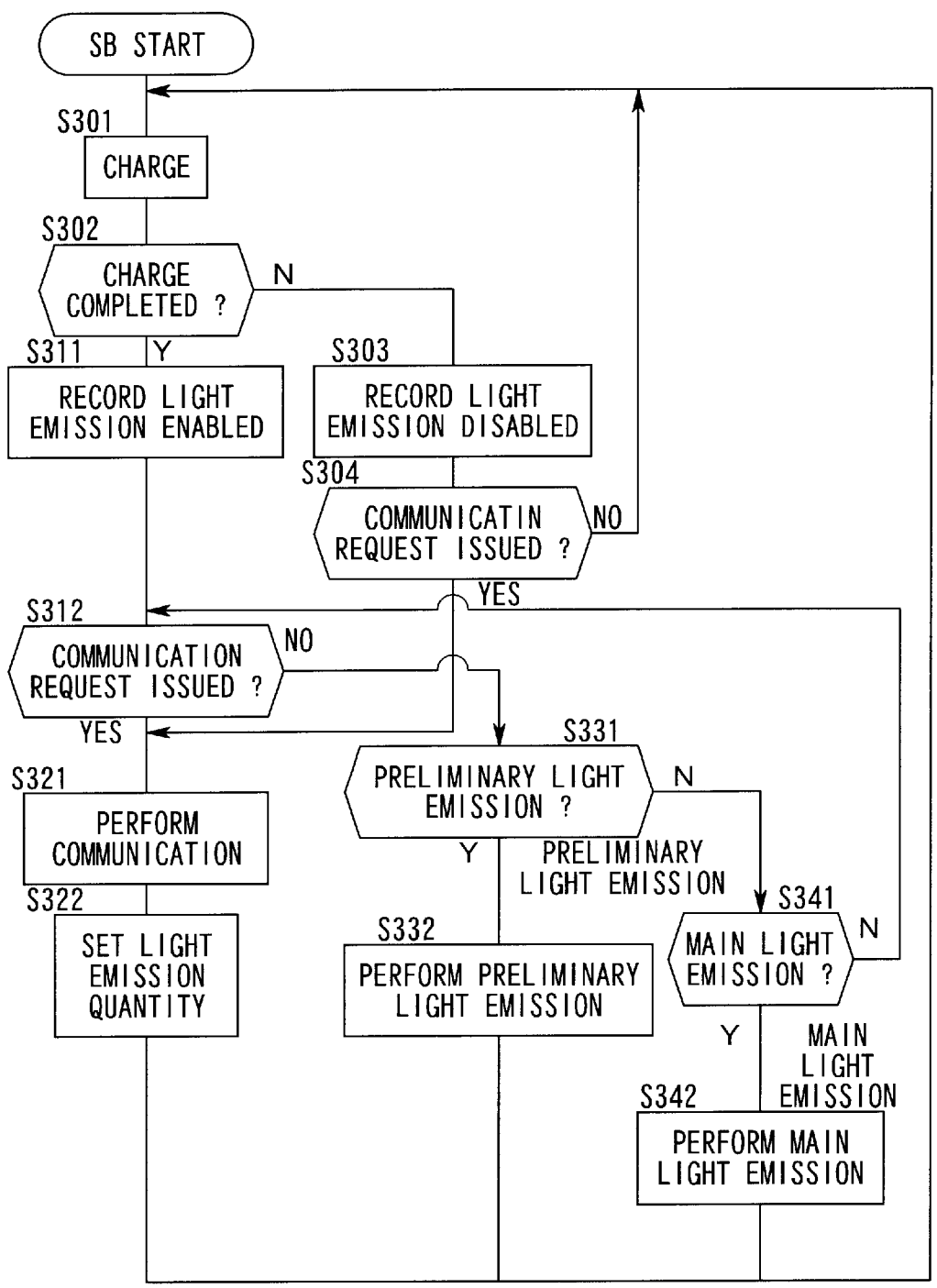
FIG. 5 is a flowchart illustrating the flow of the operation control program for the electronic flash unit executed by the flash CPU internally provided at the electronic flash unit.

Now the light emission operation at the electronic flash unit 200 is explained in reference to FIG. 5 which presents the flow of the light emission operation control program for the electronic flash unit 200 executed by the flash CPU 30 as well as FIG. 1.

The execution of the program illustrated in the flowchart in FIG. 5 by the flash CPU 30 is initiated by switching the power in the electronic flash unit 200 to the ON position. In S301, the flash CPU 30 sends an electrical charge start signal to the electronic flash circuit 32. In response, the electronic flash circuit 32 starts an electrical charge operation to charge the main condenser 34.

In S302, the flash CPU 30 verifies the state of electrical charge at the main condenser 34 achieved by the electronic flash circuit 32 and makes a decision as to whether or not the electrical charge has been completed. If a negative decision is made in S302, the flash CPU 30 branches out to S303, whereas if an affirmative decision is made, the operation proceeds to S311.

In S311, the flash CPU 30 sends an electrical charge stop signal to the electronic flash circuit 32 and records that light emission is enabled, i.e., sets a light emission enabled flag. In response to the electrical charge stop signal received from the flash CPU 30, the electronic flash circuit 32 stops the electrical charge operation at the main condenser 34.

In S312, the flash CPU 30 makes a decision as to whether or not a communication request has been issued by the DSC 100, and if it is decided that no request for communication has been issued, the operation branches out to S331. If, on the other hand, it is decided that a request for communication has been issued, the operation proceeds to S321 to engage in communication with the DSC 100. The information that may be exchanged between the DSC 100 and the electronic flash unit 200 at this time includes information as to whether or not the electronic flash unit 200 is in a light emission enabled state and information with respect to the flash time of a full light emission (transmitted from the electronic flash unit 200 to the DSC 100) and information in regard to the light emission quantity during a preliminary light emission or a main light emission (transmitted from the DSC 100 to the electronic flash unit 200).

In S322, the flash CPU 30 outputs a signal to the electronic flash circuit 32 to set the light emission quantity based upon the information regarding the light emission quantity for the preliminary light: emission or the main light emission input from the DSC 100 in S311 and then the operation returns to S301.

If a negative decision is made in S302, which indicates that the electrical charge quantity at the main condenser 34 has not reached a level at which light emission is possible, the flash CPU 30 records that light emission is disabled, i.e., the flash CPU 30 resets the light emission enabled flag, in S303.

In S304, the flash CPU 30 makes a decision with respect to whether or not a communication request has been issued by the DSC 100, and if it is decided that no request for communication has been issued, the flash CPU 30 returns to S301 to sustain the electrical charge operation to electrically charge the main condenser 34 performed by the electronic flash circuit 32. If, on the other hand, it is decided that a communication request has been issued, the flash CPU 30 proceeds to S321 to engage in communication with the DSC 100. At this time, information indicating that light emission by the electronic flash unit 200 is disabled is output from the electronic flash unit 200 to the DSC 100 in S321.

If a negative decision is made in S312, the flash CPU 30 makes a decision in S331 as to whether or not a command for a preliminary light emission has been output by the DSC 100, and if an affirmative decision is made, it proceeds to S332 to output a preliminary light emission command signal to the electronic flash circuit 32. The electronic flash circuit 32 performs a preliminary light emission based upon the light emission quantity set in advance by the flash CPU 30 in S322. When the preliminary light emission by the electronic flash circuit 32 is completed, the flash CPU 30 returns to S301.

If a negative decision is made in S331, the flash CPU 30 branches to S341 to make a decision as to whether or not a command for a main light emission has been output by the DSC 100. If a negative decision is made in S341, the flash CPU 30 returns to S312 to wait for a communication request or a light emission command to be transmitted from the DSC 100, whereas if an affirmative decision is made, in S341, it proceeds to S342 to output a main light emission command signal to the electronic flash circuit 32. The electronic flash circuit 32 then performs main light emission based upon the light emission quantity set in advance by the flash CPU 30 in S322. When the main light emission by the electronic flash circuit 32 is completed, the flash CPU 30 returns to S301.

The features that characterize the program executed by the camera CPU 20 (see FIGS. 3 and 4) explained in reference to the embodiment above are explained below.

(1) Setting the Preliminary Light Emission Quantity

In S132, the camera CPU 20 sets the preliminary light emission quantity based upon the photographing distance information input in S131 and the aperture value set at the taking lens 2 for the following reason. When flash photographing is performed, the brightness of the subject irradiated by the electronic flash unit 200 varies in reverse proportion to the square of the photographing distance. Thus, when the photographing distance increases, the reduction in the subject brightness can be compensated for by increasing the preliminary light emission quantity at the electronic flash unit 200 to improve the accuracy of detection of the brightness of the subject irradiated by the electronic flash unit 200. If the photographing distance is short, on the other hand, the preliminary light emission quantity at the electronic flash unit 200 is reduced to ensure that the light emission energy is not wasted. In addition, since the quantity of light entering the CCD 4 is reduced when the aperture of the taking lens 2 is set to larger f-number, it is advantageous to increase the preliminary light emission quantity at the electronic flash unit 200. When the aperture at the taking lens 2 is set to smaller f-number, on the other hand, the quantity of light entering the CCD 4 increases, and thus, the preliminary light emission quantity at the electronic flash unit 200 can be reduced to keep down the consumption of light emission energy.

(2) Increase in the Effective Sensitivity of the CCD During Preliminary Photographing The camera CPU 20 sends a control signal to the control circuit 6 in S134 to improve the effective sensitivity of the CCD 4 by increasing the gain at which the image signal output by the CCD 4 is amplified. This makes it possible to reduce the preliminary light emission quantity at the electronic flash unit 200 for the preliminary photographing operation so that the consumption of the light emission energy at the electronic flash unit 200 can be minimized. Generally speaking, the S/N ratio becomes lower when the gain at which the image signal output from the CCD is amplified is increased, which may result in a lowered image quality. However, the image taken during the preliminary photographing operation is not recorded in the recording medium 18 and is used to determine the light emission quantity at the electronic flash unit 200 for the main photographing operation, and thus, the reduced S/N ratio mentioned above does not present a problem.

(3) Higher Shutter Speed for Preliminary Photographing

The shutter speed for the preliminary photographing operation, which is determined by the camera CPU 20 in S135 is higher than the shutter speed for main photographing, since the preliminary photographing operation is performed to determine the light emission quantity at the electronic flash unit 200 for the main photographing operation. This contributes to an improvement in the accuracy with which the brightness of the subject illuminated through the preliminary light emission by the electronic flash unit 200 is detected by the CCD 4. In other words, in regard to the total quantity of light entering the CCD 4, the relative reduction in the so-called ambient light component results in an improvement in the accuracy with which the flash light is detected. By setting a high shutter speed for the preliminary photographing operation in this manner, it is possible to prevent the flash control accuracy from becoming poor during flash photographing in bright conditions in particular, and in addition, the operability can be improved by reducing the length of time elapsing after the photographer operates the release button until the main photographing operation starts, i.e., by reducing shutter lag.

(4) Processing Performed When the Flash Time is Longer Than the Exposure Time

In S140, the camera CPU 20 compares the shutter speed (exposure time) obtained in S111 with the flash time calculated in S139, and if it is decided the flash time is longer than the exposure time, the camera CPU 20 performs the processing for reducing the flash time in S141, thereby implementing control to ensure that the flash is completed within the exposure time. This prevents wasteful consumption of light emission energy caused by continuation of the light emission by the electronic flash unit 200 even though the CCD 4 has already completed the exposure operation. In addition, when outputting an image signal to the control circuit 6 by transferring the electrical charges stored at the individual pixels of the CCD 4, smearing may occur in the image if intense light hits the light-receiving surface of the CCD 4. While smearing may be caused by intense light reflected at a reflective metal surface or the like in the subject which then enters the CCD 4 if the electronic flash unit 200 remains emitting light when the CCD 4 is in the process of outputting an image signal to the control circuit after ending the exposure operation, such a problem can be prevented in the DSC 100 in the embodiment of the present invention in which the electronic flash unit 200 does not emit light after the exposure is completed.

(5) Image Processing Performed When the Flash Time at the Electronic Flash Unit is Reduced When it is decided that the flash time is longer than the exposure time based upon the results of the determination performed in S140 as described above, the camera CPU 20 performs the processing for reducing the flash time in S141 and calculates the quantity of the resulting underexposure. Then, the image processing circuit 8 engages in the color correction processing by incorporating the underexposure quantity that has been obtained in advance as described above during the image processing to achieve color reproduction with a high degree of fidelity. To explain this point in further detail, if the main photographing operation is performed after implementing the processing for reducing the flash time in S141, underexposure occurs for the image corresponding to the main subject irradiated by the electronic flash unit 200 while correct exposure is achieved for the image corresponding to the background. The image processing circuit 8 separates the image of the background from the image of the main subject and then performs color correction individually for the background and the main subject so that high fidelity color reproduction is achieved.

Alternatively, the correct exposure quantity for the main subject may be achieved to realize high fidelity color reproduction by increasing the gain at which the control circuit 6 amplifies the image signal output from the CCD 4 based upon the underexposure quantity calculated in S141. In this case, it is conceivable that while the correct exposure quantity is achieved for the main subject illuminated by the electronic flash unit 200, the background is overexposed. However, since the image processing circuit 8 separates the image of the background from the image of the main subject and then performs color correction individually as suited for the background and the main subject, high fidelity color reproduction is achieved.

(6) Photographing Performed Twice in Response to a Single Photographing Start Operation When performing flash photographing, the camera CPU detects a single photographing start operation in S112, and in response to the detection, it performs the preliminary photographing operation, i.e., the first photographing operation in S136 and performs the main photographing operation, i.e., the second photographing operation in S144. Based upon the results of the preliminary photographing operation, it determines the light emission quantity at the electronic flash unit 200 for the main photographing operation in S138. During this process, the image data obtained through the preliminary photographing operation are not recorded in the recording medium 18 and only the image data obtained through the main photographing operation are recorded in the recording medium 18. This eliminates the need for providing a light-receiving element for TTL autoflash control, an optical system for guiding the subject light to the light-receiving element and the like as would otherwise be required in an electronic camera in the prior art and, as a result, an inexpensive, compact and lightweight electronic camera which is capable of controlling the light emission quantity at the electronic flash unit 200 with a high degree of accuracy without reducing the sensitivity of the solid imaging device can be provided.

(7) Operating Sequence Adopted by the Camera CPU 20 When Flash Photographing is not Performed If it is decided that flash photographing is not to be performed in S113, the camera CPU 20 engages in main photographing without performing any preliminary photographing (S122). Thus, the length of time elapsing after the photographer operates the release button until the main photographing operation actually starts, i.e., the shutter lag, can be reduced by preventing any superfluous operation of the DSC 100 when flash photographing is not performed, to improve the operability of the DSC 100.

Second Embodiment

Figure 6:
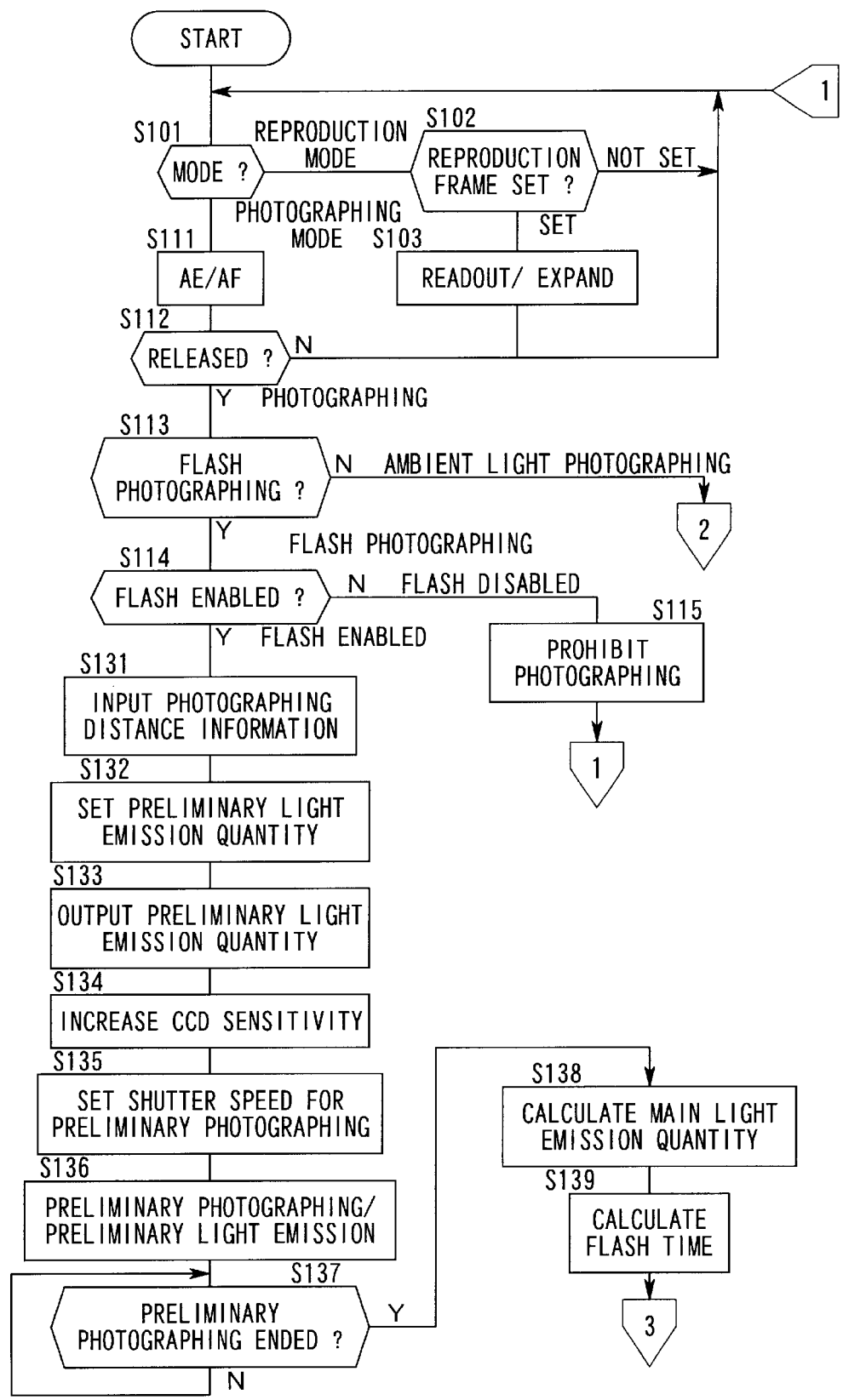
FIG. 6 is a flowchart illustrating the flow of the operation control program for the electronic camera which is executed by the camera CPU internally provided at the electronic camera in the second embodiment.
Figure 7:
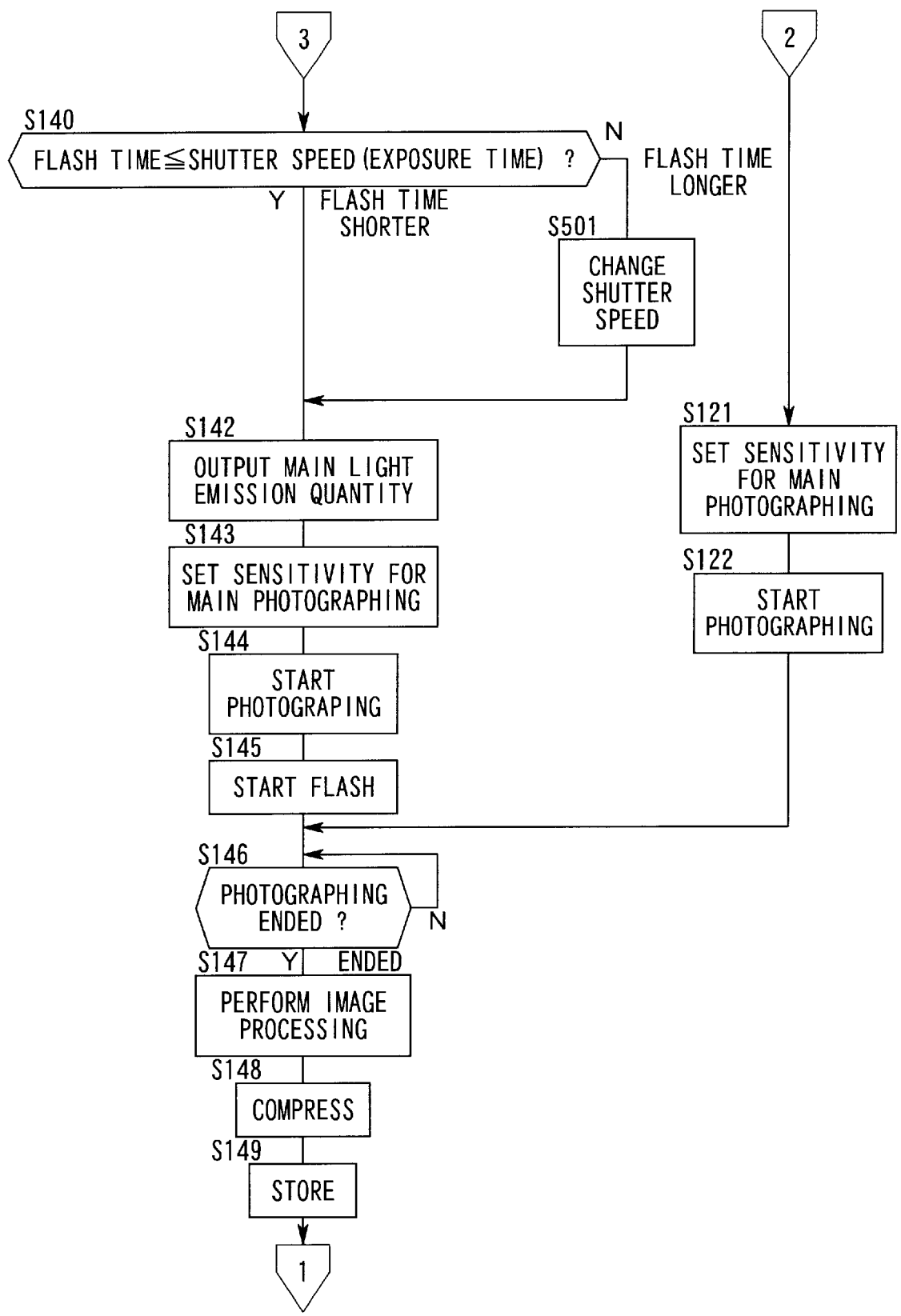
FIG. 7 is a continuation of the flowchart presented in FIG. 6 illustrating the flow of the operation control program for the electronic camera which is executed by the camera CPU internally provided at the electronic camera in the second embodiment.

In the second embodiment, too, the present invention is adopted in the DSC 100 which is identical to the DSC explained in reference to the first embodiment. The only difference from the first embodiment is the contents of the operation control program for the DSC 100 executed by the camera CPU 20, while the internal structures of the DSC 100 and the electronic flash unit 200 mounted at the DSC 100 are identical to those illustrated in FIG. 1. Therefore, an explanation is given on the second embodiment by referring to FIGS. 6 and 7 that illustrate the flow of the operation control program for the DSC 100 executed by the camera CPU 20 as well as FIG. 1. It is to be noted that the same step numbers are assigned to steps in the flowchart in FIGS. 6 and 7 in which processing identical to that performed in the flow chart in FIGS. 3 and 4 is performed to preclude the necessity for repeated explanation thereof.

In the first embodiment, the camera CPU 20 reduces the flash time if it is decided that the flash time is longer than the shutter speed (exposure time). In the second embodiment, the camera CPU 20 engages in processing to extend the exposure time under such circumstances instead of reducing the length of flash time. This processing is now explained.

In S140, the camera CPU 20 compares the shutter speed (exposure time) obtained in S111 with the flash time calculated in S139, and proceeds to S142 if it is decided that the flash time is equal to or less than the shutter speed. If, on the other hand, it is decided that the flash time is longer than the exposure time, the camera CPU 20 branches to S501 to engage in processing for changing the exposure time. Thus, a new exposure time is set to ensure that the exposure does not end while the electronic flash unit 200 is emitting light. During this process, the extended exposure time results in an excessive exposure quantity, i.e., overexposure, and the camera CPU 20 calculates the quantity of this overexposure and stores it in memory.

When the camera CPU 20 has executed the processing in S501 described above, i.e., when overexposure has occurred, the camera CPU 20 outputs information related to the overexposure quantity calculated in S501 as well to the image processing circuit 8 when it outputs the image processing control signal to the image processing circuit 8 in S147. The image processing circuit 8 performs color correction which is achieved by adjusting the gradation, the saturation, the contrast and the like, based upon the information regarding the overexposure quantity input by the camera CPU 20, to realize high fidelity color reproduction.

As explained above, in the DSC 100 in the second embodiment, even when the exposure time is extended due to a longer flash time compared to the exposure time, the overexposure quantity is known before the image processing. Consequently, the color correction during the image processing can be performed with an even higher degree of accuracy by incorporating the overexposure quantity, to minimize the degree to which the image quality is lowered. During this process, the image processing circuit 8 may separate the image of the background from the image of the main subject to perform color correction individually suited for the background and the main subject. By implementing color correction in this manner, high fidelity color reproduction can be achieved in the images both of the main subject and the background.

It is to be noted that it is not essential that the overexposure quantity be incorporated in the image processing performed by the image processing circuit 8 in the second embodiment explained above. In such a case, it is conceivable that while the correct exposure quantity is achieved for the main subject illuminated by the electronic flash unit 200, the background will be overexposed. However, generally speaking, the advantage of the correct exposure achieved for the main subject more than compensates for the disadvantage of the background being overexposed.

In addition, the correct exposure quantity may be set for the background by reducing the gain at which the control circuit 6 amplifies the image signal output from the CCD 4 to achieve high fidelity color reproduction in the second embodiment. In such a case, the main subject illuminated by the electronic flash unit 200 may become underexposed. However, through color correction performed by the image processing circuit 8, high fidelity color reproduction can be achieved.

Third Embodiment

In the third embodiment, too, the present invention is adopted in the DSC 100 which is identical to the DSC explained in reference to the first and second embodiments. The only difference from the first and second embodiments is the contents of the operation control program for the DSC 100 executed by the camera CPU 20, while the internal structures of the DSC 100 and the electronic flash unit 200 mounted at the DSC 100 are identical to those illustrated in FIG. 1. Therefore, an explanation is given on the second embodiment by referring to FIGS. 8 and 9 that illustrate the flow of the operation control program for the DSC 100 executed by the camera CPU 20 as well as FIG. 1. It is to be noted that the same step numbers are assigned to steps in the flowchart in FIGS. 8 and 9 in which processing identical to that performed in the flowchart in FIGS. 3 and 4 is performed to preclude the necessity for repeated explanation thereof.

In the first and second embodiments, the camera CPU 20 either shortens the flash time or extends the exposure time if it is decided that the flash time is longer than the shutter speed (exposure time). In the third embodiment, the camera CPU 20 does not reduce the flash time or extend the exposure time under such circumstances. Instead, the camera CPU 20 calculates the quantity of underexposure caused by an insufficient length of flash time and engages in gradation correction for the image data based upon the calculated underexposure quantity.

Figure 8:
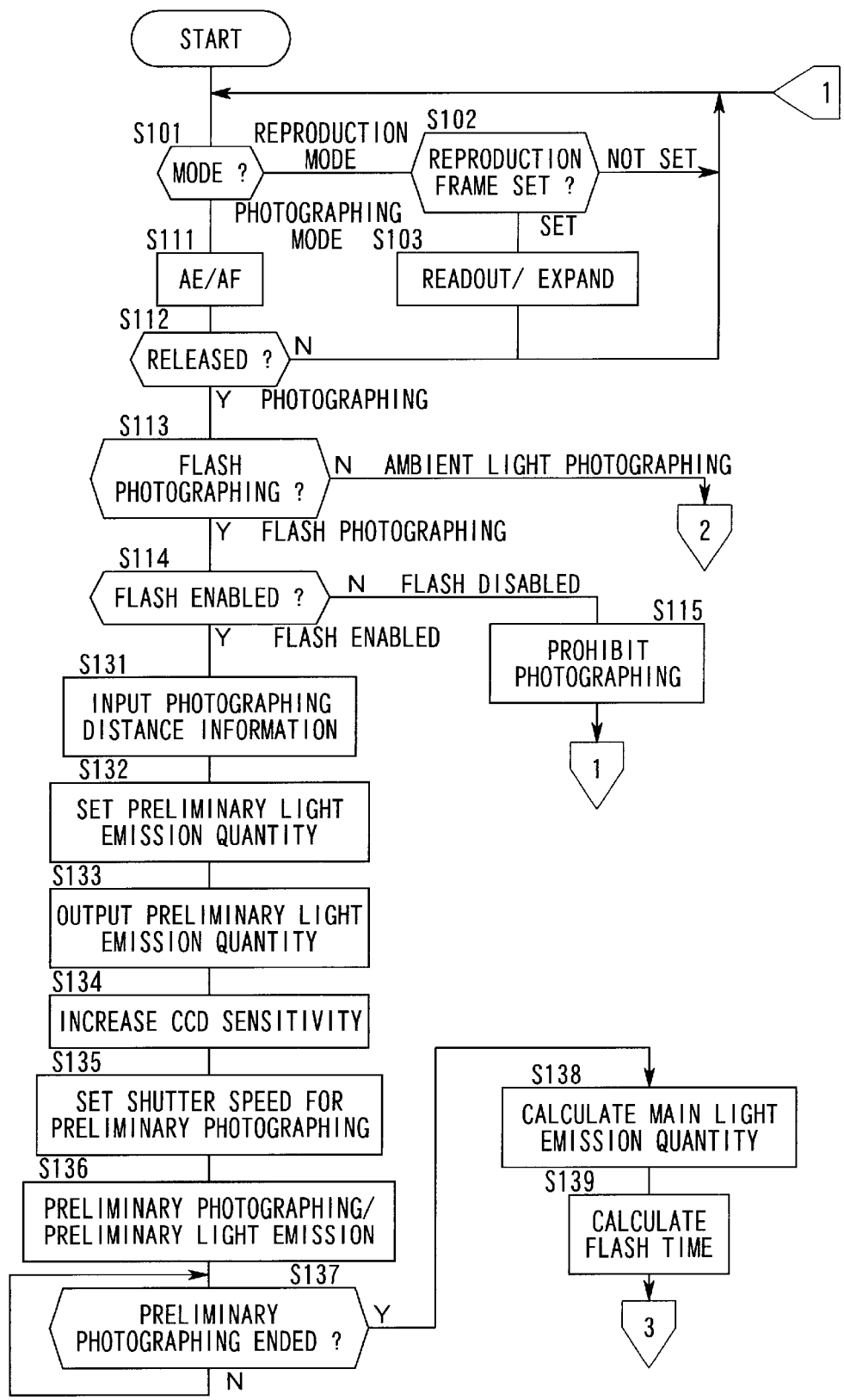
FIG. 8 is a flowchart illustrating the flow of the operation control program for the electronic camera which is executed by the camera CPU internally provided at the electronic camera in the third embodiment.
Figure 9A:
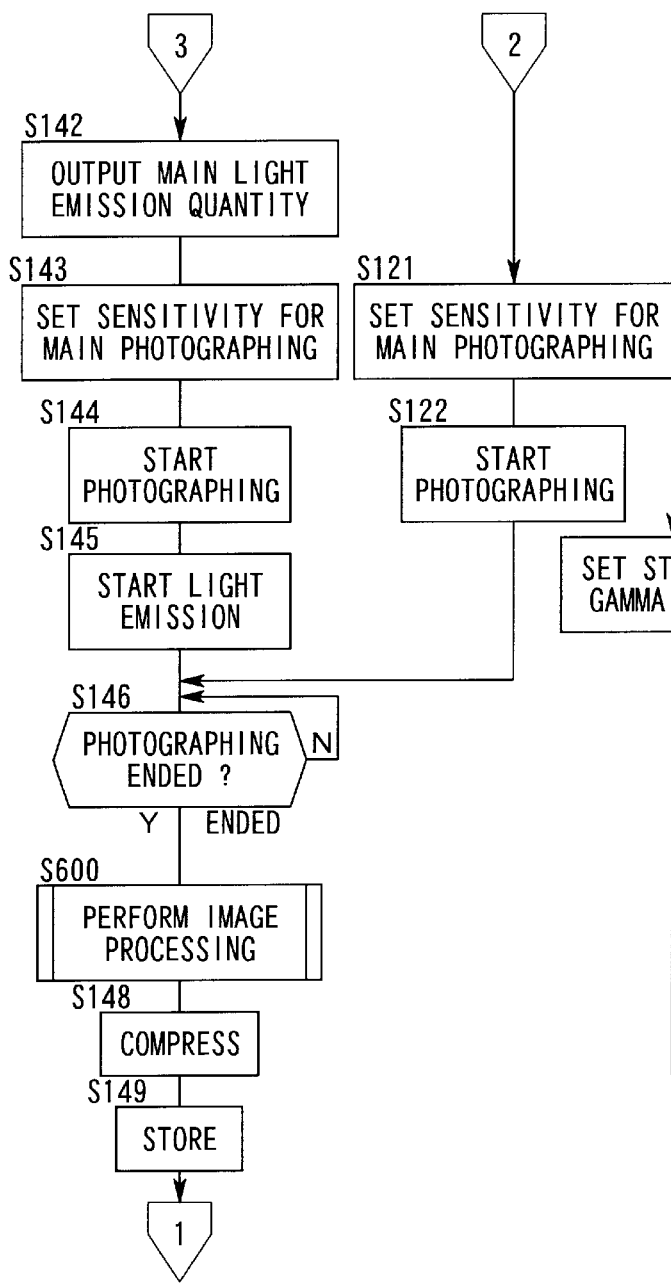
FIG. 9A is a continuation of the flowchart presented in FIG. 8 illustrating the flow of the operation control program for the electronic camera which is executed by the camera CPU internally provided at the electronic camera in the third embodiment.

In the third embodiment, following the processing in S139 in the flowchart presented in FIG. 8, the camera CPU 20 performs a series of photographing processing in S142~S146 in FIG. 9A, without comparing the flash time and the exposure time. In S600 which follows S146, the camera CPU 20 calls up a sub-program for image processing which is to be explained below in reference to FIG. 9B.

Figure 9B:
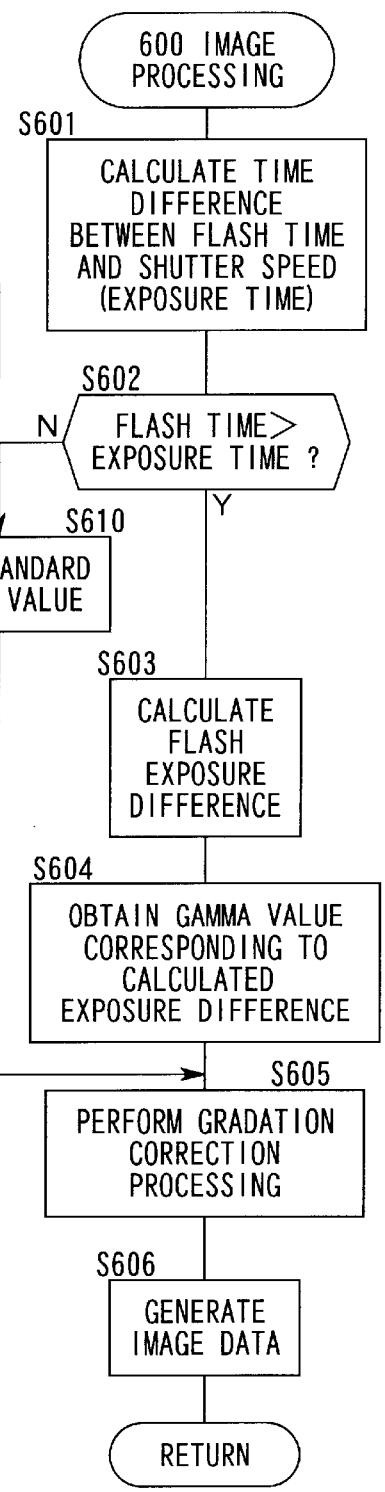
FIG. 9B is a flowchart illustrating the flow of the operation control program for the electronic camera executed by the camera CPU internally provided at the electronic camera in the third embodiment, which presents the procedural flow of the sub-program that is executed when called up by the program corresponding to the flowchart in FIG. 9A.

FIG. 9B is a flowchart illustrating the processing in the sub-program for the image processing executed by the camera CPU 20. In S601, the camera CPU 20 calculates the difference between the shutter speed (exposure time) obtained in S111 and the flash time calculated in S139. In S602, the camera CPU 20 makes a decision as to whether or not the flash time is longer than the exposure time, and if an affirmative decision is made it proceeds to S603. In S603, the camera CPU 20 calculates the quantity of underexposure resulting from the flash time exceeding the exposure time. The underexposure quantity may be calculated, for instance, based upon the exposure quantity that is achieved through the preset flash time and the exposure quantity that is actually achieved by the flash light during the exposure time.

In S604, the camera CPU 20 calculates gradation correction data (gamma value) that will ensure that an even better image signal is obtained through the image processing based upon the calculated underexposure quantity, or selects such gradation correction data from the data table. To explain this point in further detail, in a configuration provided with a data table, gamma values corresponding to image data containing underexposure quantities at ±0 level, −0.5 level, −1 level, −1.5 levels, −2 levels . . . in EV conversion, for instance, are stored in a memory connected to the camera CPU 20. The gamma values are determined in advance in correspondence to the individual underexposure quantities by ensuring that the gradation of the image will be suitable for viewing or suitable for the subsequent processing of the image data. In other words, since an image becomes darker and the density increases as the degree of underexposure increases, gamma values set in correspondence to underexposure quantities to reduce the density of the image and to express rich gradation.

It is to be noted that the gamma values corresponding to the underexposure quantities stored in the data table described above do not need to be specifically set in increments of 0.5 with the lower limit set at −2. The increments and the lower limit for the data table may be set freely as necessary.

Instead of employing the data table method described above, the gamma values may be calculated by obtaining an approximate expression in advance using a high-order polynomial or the like based upon the relationship between the underexposure quantities and the gamma values corresponding to the underexposure quantities and by programming the approximate expression. The gamma value calculation method achieves an advantage in that gamma values can be calculated in finer increments in correspondence to the underexposure quantities compared to the method in which discrete data are stored in a data table.

While the processing described above is performed when an affirmative decision is made in S602, if a negative decision is made in S602, the camera CPU 20 branches to S610 to set a standard gamma value. Namely, the camera CPU 20 selects the gamma value corresponding to the underexposure quantity at ±0 level from the data table or calculates such a gamma value. It is to be noted that the determination in S602 and the setting of the standard gamma value in S610 may be omitted and instead a gamma value may be determined in S603 and S604 regardless of whether or not the exposure effected by the flash light is insufficient.

In S605, the camera CPU 20 performs gradation correction processing using the gamma value either selected or calculated in S604 or S610. In more specific terms, the camera CPU 20 outputs the gamma value selected or calculated in S604 or S610 to the image processing circuit 8. In S606, the camera CPU 20 sends a control signal to the image processing circuit 8. In response to this, the image processing circuit 8 generates image data and outputs them to the frame memory 10.

As explained above, with the DSC 100 in the third embodiment in which the quantity of underexposure occurring when the flash time is longer than the exposure time and, consequently, the entire flash light at the preset light emission quantity cannot be irradiated on the subject within the exposure time can be obtained prior to the image processing, the color correction during the image processing can be achieved with an even higher degree of accuracy to minimize the degree to which the image quality is lowered.

It is to be noted that the correct exposure quantity for the main subject may be also set by increasing the gain at which the control circuit 6 amplifies the image signal output by the CCD 4 based upon the underexposure quantity calculated in S603 to achieve high fidelity color reproduction. It is conceivable that in this case, while the correct exposure quantity is achieved for the main subject illuminated by the electronic flash unit 200, the background is overexposed. This overexposure may remain uncorrected for the same reason as that given in the explanation of the second embodiment or the reduction in the image quality of the background caused by the overexposure may be minimized through color correction performed by the image processing circuit 8.

While the camera CPU 20 in the embodiment explained above obtains a gamma value that is appropriate for the gradation correction processing based upon the calculated underexposure quantity, the camera CPU 20 may output the calculated underexposure quantity to the image processing circuit 8 instead. In such a case, the gamma value is obtained inside the image processing circuit 8 in correspondence to the data related to the underexposure quantity output by the camera CPU 20 and the image processing is performed using this gamma value. In addition, while an explanation is given above only on an example in which the gradation correction is performed by correcting the gamma value, it is also possible to implement gradation correction through correction of the highlight/shadow level.

In the embodiment explained above, the processing through which the exposure time is extended when the flash time is longer than the exposure time and therefore, the entire flash light at the preset light emission quantity cannot be irradiated on the subject within the exposure time is not performed. The degree of the adverse effect of the underexposure occurring due to an insufficient flash light quantity is reduced through image processing. Alternatively, processing for extending exposure time may be implemented when the flash time is longer than the exposure time and the entire flash light at the preset light emission quantity cannot be irradiated on the subject within the exposure time. In such a case, gamma values corresponding to overexposure quantities may be stored in the table mentioned earlier. In other words, since the image becomes lighter and the density becomes reduced as the overexposure quantity increases, gamma values corresponding to the degrees of overexposure may be stored in the data table to ensure that the density of the image is increased to enable rich expression of the gradation.

Fourth Embodiment

Figure 10:
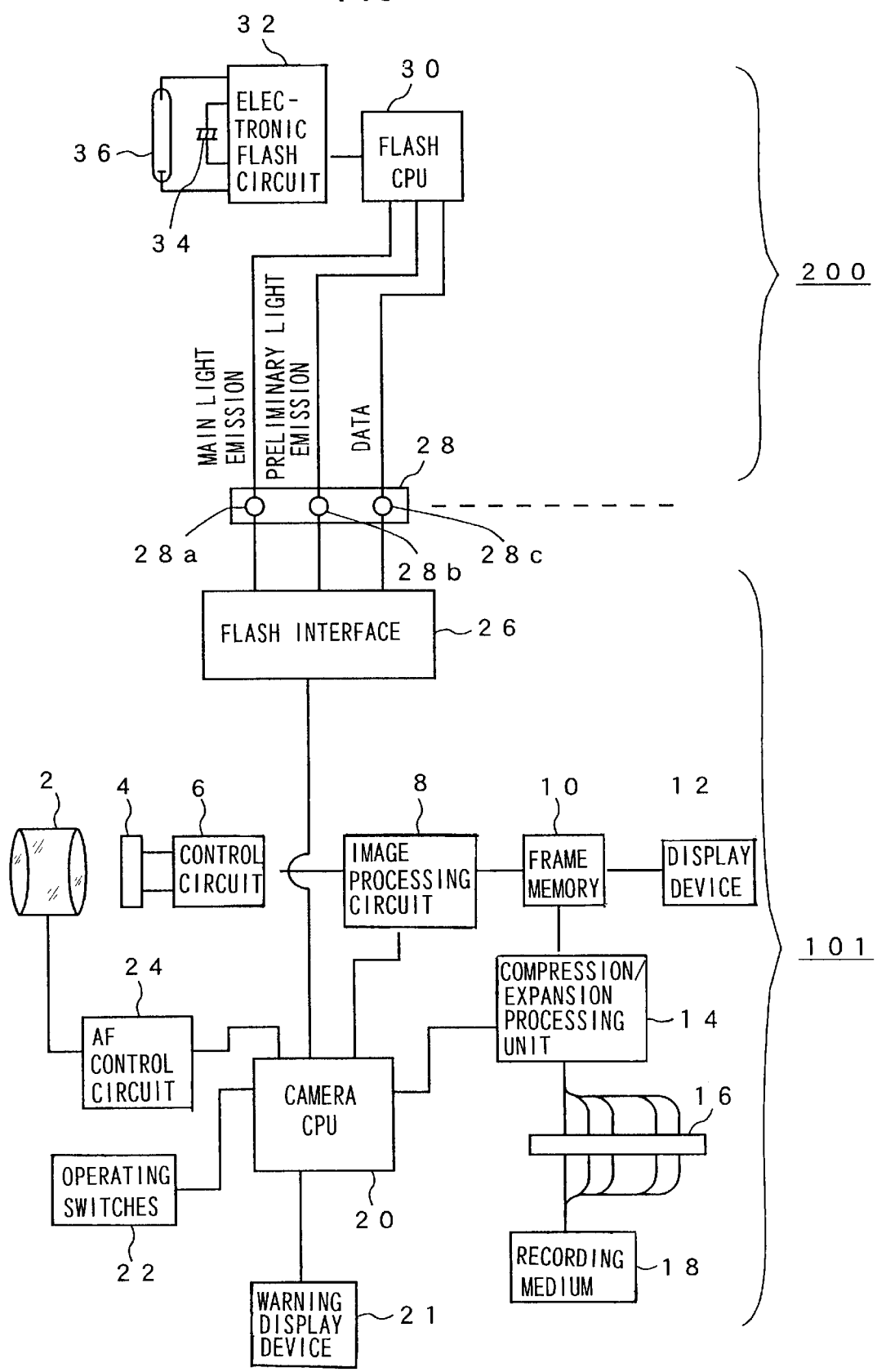
FIG. 10 illustrates schematic structures of the electronic camera in a fourth embodiment of the present invention and the electronic flash unit mounted at the electronic camera.

FIG. 10 illustrates an example in which the present invention is adopted in a DSC that allows the electronic flash unit 200 to be freely attached or detached and presents schematic structures of a DSC 101 and the electronic flash unit 200. In FIG. 10, the same reference numbers are assigned to components identical to those in FIG. 1 illustrating the schematic structures of the DSC 100 and the electronic flash unit 200 in the first embodiment to preclude the necessity for repeated explanation thereof.

The DSC 101 differs from the DSC 100 shown in FIG. 1 in that it is further provided with a warning display device 21 with all the other components including the electronic flash unit 200 being identical to those shown in FIG. 1. The warning display device 21 is provided to display a warning to the photographer when the flash time is longer than the exposure time, as is to be explained later, and may be constituted of an LED, a liquid crystal display device or the like. It is to be noted that while the warning display device 21 may be omitted by displaying the warning on the display device 12 provided to display images obtained through photographing, or a warning sound may be output using a buzzer or the like instead of a warning display, an explanation is given below on an example in which the warning display device 21 is provided.

Figure 11:
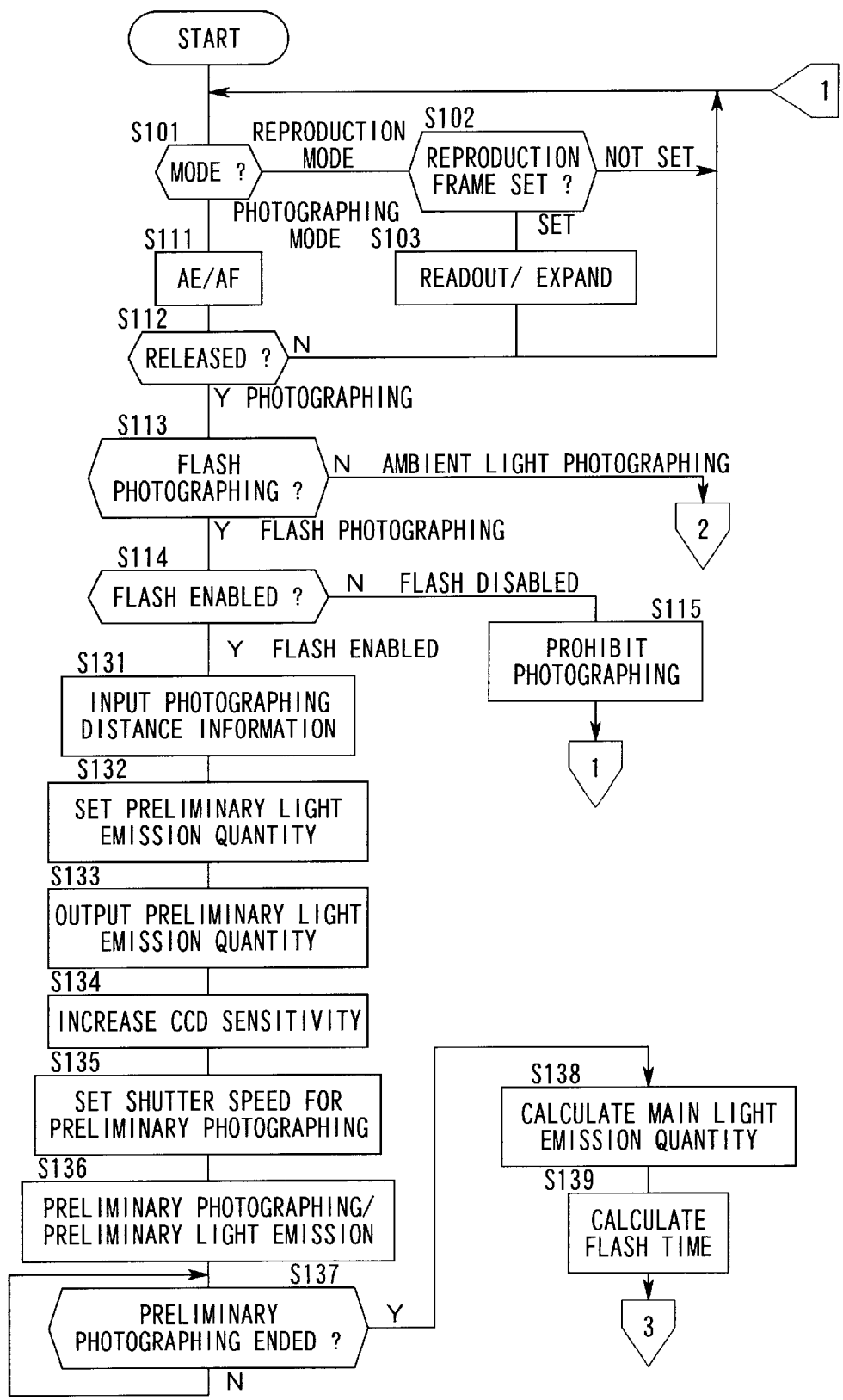
FIG. 11 is a flowchart illustrating the flow of the operation control program for the electronic camera which is executed by the camera CPU internally provided at the electronic camera in the fourth embodiment.
Figure 12:
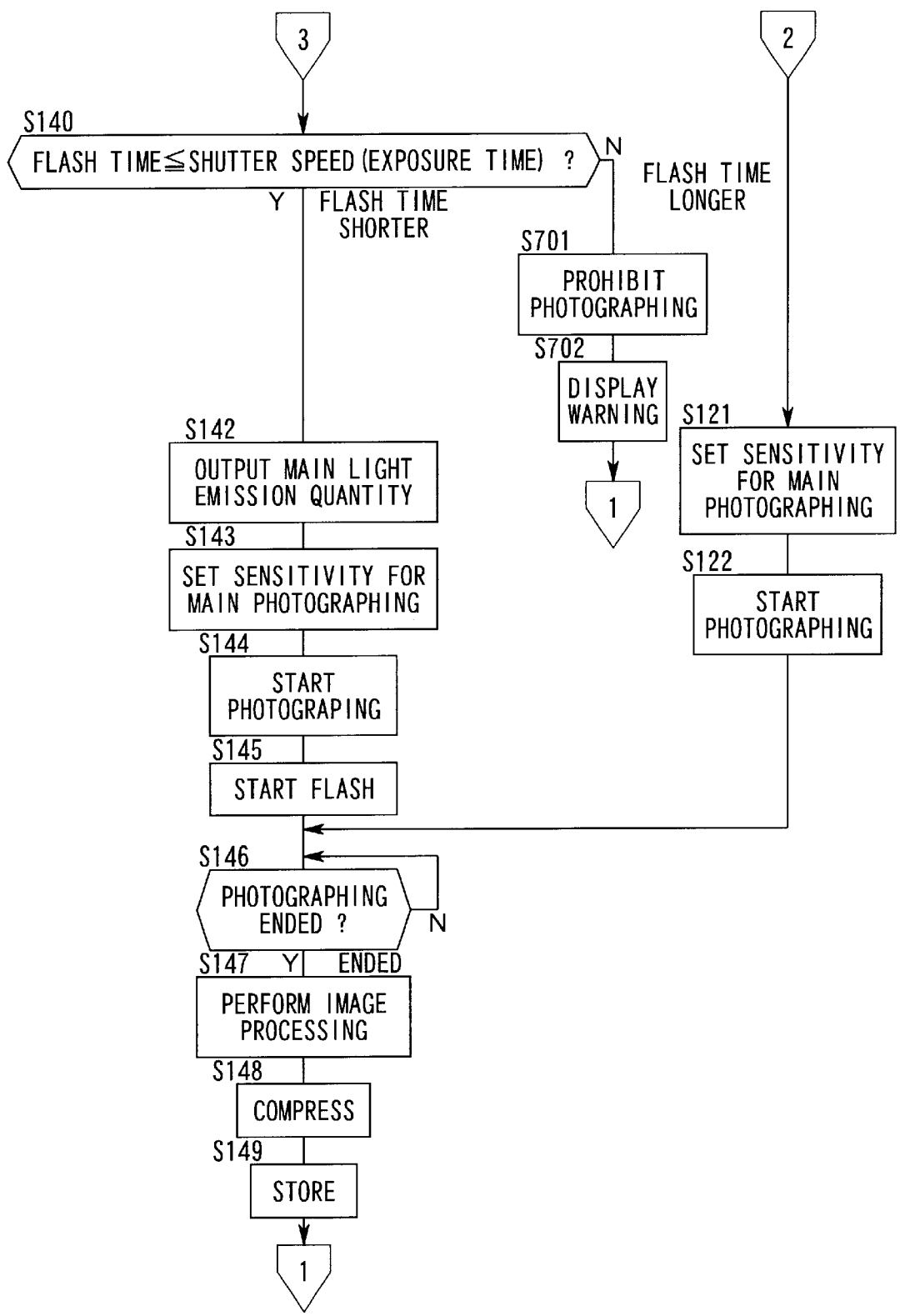
FIG. 12 is a continuation of the flowchart presented in FIG. 11 illustrating the flow of the operation control program for the electronic camera which is executed by the camera CPU internally provided at the electronic camera in the fourth embodiment.

Now, the operation of the DSC 101 is explained in reference to FIGS. 11 and 12 illustrating the flow of the operation control program for the DSC 101 executed by the camera CPU 20 as well as FIG. 10. It is to be noted that in the flowchart in FIGS. 11 and 12, the same step numbers are assigned to steps in which identical processing to that in the flowchart in FIG. 3 is performed to preclude the necessity for repeated explanation thereof.

In the first through third embodiments, the camera CPU 20 continues with a photographing operation in one form or another even when the flash time is longer than the exposure time and color correction is implemented during the subsequent image processing to minimize the degree of loss of image quality. In contrast, in the fourth embodiment, a warning is issued to the photographer as explained below when the flash time is longer than the exposure time and then the photographing operation is prohibited, i.e., a release lock is set.

In S140, the camera CPU 20 compares the shutter speed (exposure time) obtained in S111 with the flash time calculated in S139, and proceeds to S142 if it is decided that the flash time is equal to or less than the shutter speed. If, on the other hand, it is decided that the flash time is longer than the exposure time, the camera CPU 20 branches to S701 to engage in photographing prohibition processing, i.e., to set a release lock, and implements warning display on the warning display device 21 in S702 before returning to S101.

With the camera CPU 20 implementing the control of the operation of the DSC 101 as described above, a release lock is automatically set when the flash time is longer than the exposure time and a warning to that effect is displayed for the photographer so that no image is taken at an insufficient flash light quantity and that wasteful consumption of the light emission energy at the electronic flash unit 200 is avoided. In this situation, the photographer can continue photographing by reducing the light emission quantity at the electronic flash unit 200 and consequently, setting a shorter flash time through such measures as reducing the distance between the DSC 101 and the main subject (photographing distance).

It is to be noted that when the DSC 101 in this embodiment implements both a release lock and a warning display, only the warning display in S701 may be implemented with the processing for prohibiting photographing in S701 omitted to enable the continuation of the photographing operation if the photographer performs a release operation after the warning is displayed, so that the risk of missing a valuable shutter opportunity is eliminated. In addition, by performing the processing explained in reference to the first through third embodiments if the photographing operation is performed after the warning is displayed in this manner, advantages similar to those explained in reference to the first through third embodiments are achieved. Namely, wasteful consumption of light emission energy during flash photographing is minimized and an image achieving high fidelity color reproduction can be obtained. In addition, by implementing the warning display as described above, the photographer can learn in advance that the flash time is longer than the exposure time, which enables the photographer to take measures such as changing the photographic composition.

While an explanation is given above on the first fourth~embodiments in which the DSCs 100 and 101 allow the taking lens 2 to be exchanged and the electronic flash unit 200 to be attached and detached freely, the present invention may be adopted in a DSC in which the taking lens and the electronic flash unit are integrated with the camera main body.

In addition, while an explanation is given on the electronic flash unit 200 that controls the light emission quantity by varying the flash time to adjust the quantity of exposure achieved by the flash light, the present invention may be adopted when the electronic flash unit employs the so-called "flashmatic" method whereby the exposure quantity is adjusted through the aperture at the taking lens in correspondence to the photographing distance while the flash time (light emission quantity) remains the same or when the electronic flash unit employs the light emission quantity control method and the flashmatic method in combination. It is to be noted that if the electronic flash unit employs the flashmatic method, the processing in S138 and S139 in FIGS. 3~4, FIGS. 6~9 and FIGS. 11~12 becomes redundant, and the flash time that is compared with the exposure time in S140 is a constant length of time.

While the image processing circuit 3 and the compression/expansion processing unit 14 are components that are independent of the camera CPU 20 in the internal structure of the DSC 100 or 101 in FIG. 1 or FIG. 10, the processing performed by the image processing circuit 8 and the compression/expansion processing unit 14 may be implemented by the camera CPU 20. In addition, the recording medium 18 does not necessarily have to be constituted of flash memory such as a Compact Flash card or a Smart Media card, and it may be instead constituted of a magnetic recording device or the like. Furthermore, while an explanation is given on an example in which the solid imaging device is constituted of a CCD, other types of solid imaging devices such as a MOS sensor may be employed instead.

While an explanation has been given above on an example in which the present invention is adopted in a DSC, it may be adopted in other types of image input apparatuses as long as they employ an electronic flash unit to input images.

What is claimed is:

1. An electronic camera comprising:
   an imaging device that performs photoelectric conversion on an image formed by a taking lens and outputs an image signal;
   an exposure time determination unit that determines an exposure time for said imaging device based upon a subject brightness;
   a light emission quantity control unit that, when performing photographing with an electronic flash unit, controls a light emission quantity by controlling a length of flash time at said electronic flash unit;
   an arithmetic operation unit that calculates a quantity of underexposure occurring as a result of an interrupted exposure of a subject illuminated by said electronic flash unit due to a shorter exposure time when the flash time is longer than the exposure time; and
   a signal processing unit that performs image processing on image data generated by amplifying said image signal output by said imaging device at a specific gain by incorporating the quantity of underexposure calculated at said arithmetic operation unit when engaging in, at least, either adjustment of said gain or color correction for said image processing.

2. An electronic camera according to claim 1, further comprising:
   a data table in which processing parameters corresponding to said quantity of underexposure are stored, wherein;
   said signal processing unit performs said image processing using said processing parameters read out in correspondence to said quantity of underexposure from said data table.

3. An electronic camera according to claim 1, wherein:
   said signal processing unit separates an image of a background from an image of a main subject and performs color correction individually for the background and the main subject.

4. An electronic camera comprising:
   an imaging device that performs photoelectric conversion on an image formed by a taking lens and outputs an image signal;
   an exposure time determination unit that determines an exposure time for said imaging device based upon a subject brightness;
   a light emission quantity control unit that, when performing photographing with an electronic flash unit, controls a light emission quantity by controlling a length of flash time at said electronic flash unit; and an exposure quantity control unit that ensures that a flash operation by said electronic flash unit is completed within said exposure time by reducing said flash time if said flash time is longer than said exposure time.

5. An electronic camera according to claim 4, further comprising:

a signal processing unit that performs image processing on image data generated by amplifying said image signal output by said imaging device at a specific gain; and an arithmetic operation unit that calculates a quantity of underexposure occurring due to a reduction in said flash time effected by said light emission quantity control unit, wherein:

said signal processing unit engages in, at least, either adjustment of said gain or color correction through said image processing based upon said quantity of underexposure calculated at said arithmetic operation unit.

6. An electronic camera according to claim 5, further comprising:

a data table in which processing parameters corresponding to said quantity of underexposure are stored, wherein;

said signal processing unit performs said image processing using said processing parameters read out in correspondence to said quantity of underexposure from said data table.

7. An electronic camera according to claim 5, wherein:

said signal processing unit separates an image of the background from an image of the main subject and performs color corrections individually for the background and the main subject.

8. An electronic camera comprising:

an imaging device that performs photoelectric conversion on an image formed by a taking lens and outputs an image signal;

an exposure time determination unit that determines an exposure time for said imaging device based upon a subject brightness;

a light emission quantity control unit that, when performing photographing with an electronic flash unit, controls a light emission quantity by controlling a length of flash time at said electronic flash unit; and an exposure quantity control unit that sets said exposure time roughly equal to said flash time by extending said exposure time if said flash time is longer than said exposure time.

9. An electronic camera according to claim 8, further comprising:

a signal processing unit that performs image processing on image data generated by amplifying an image signal output by said imaging device at a specific gain; and an arithmetic operation unit that calculates a quantity of overexposure occurring due to an extension of said exposure time effected by said exposure quantity control unit, wherein:

said signal processing unit engages in, at least, either adjustment of said gain or color correction through said image processing based upon said quantity of overexposure calculated at said arithmetic operation unit.

10. An electronic camera according to claim 9, further comprising:

a data table in which processing parameters corresponding to said quantity of overexposure are stored, wherein;

said signal processing unit performs said image processing using said processing parameters read out in correspondence to said quantity of overexposure from said data table.

11. An electronic camera according to claim 9, wherein:

said signal processing unit separates an image of the background from an image of the main subject and performs color corrections individually for the background and the main subject.

12. An electronic camera comprising:

an imaging device that performs photoelectric conversion on an image formed by a taking lens and outputs an image signal;

an exposure time determination unit that determines an exposure time for said imaging device based upon a subject brightness;

a light emission quantity control unit that, when performing photographing with an electronic flash unit, controls a light emission quantity by controlling a length of flash time at said electronic flash unit; and a photographing operation prohibiting unit that prohibits a photographing operation if said flash time is longer than said exposure time.

13. An electronic camera comprising:

an imaging device that performs photoelectric conversion on an image formed by a taking lens and outputs an image signal;

an exposure time determination unit that determines an exposure time for said imaging device based upon a subject brightness;

a light emission quantity control unit that, when performing photographing with an electronic flash unit, controls a light emission quantity by controlling a length of flash time at said electronic flash unit; and a warning unit that transmits a warning if said flash time is longer than said exposure time.

14. An electronic camera according to claim 13, further comprising:

an light emission quantity control unit that ensures that a flash operation by said electronic flash unit is completed within said exposure time by reducing said flash time if it is detected that a release operation is performed after said warning is issued by said warning unit.

15. An electronic camera according to claim 14, further comprising:

a signal processing unit that performs image processing on image data generated by amplifying said image signal output by said imaging device at a specific gain; and an arithmetic operation unit that calculates a quantity of underexposure occurring due to a reduction in said flash time effected by said light emission quantity control unit, wherein:

said signal processing unit engages in, at least, either adjustment of said gain or color correction through said image processing based upon said quantity of underexposure calculated at said arithmetic operation unit.

16. An electronic camera according to claim 15, further comprising:

a data table in which processing parameters corresponding to said quantity of underexposure are stored, wherein;

said signal processing unit performs said image processing using said processing parameters read out in correspondence to said quantity of underexposure from said data table.

17. An electronic camera according to claim 15, wherein:

said signal processing unit separates an image of the background from an image of the main subject and performs color corrections individually for the background and the main subject.

18. An electronic camera according to claim 13, further comprising:

an exposure quantity control unit that sets said exposure time roughly equal to said flash time by extending said exposure time if it is detected that a release operation is performed after said warning is issued by said warning unit.

19. An electronic camera according to claim 18, further comprising:

a signal processing unit that performs image processing on image data generated by amplifying an image signal output by said imaging device at a specific gain; and an arithmetic operation unit that calculates a quantity of overexposure occurring due to an extension of said exposure time effected by said exposure quantity control unit, wherein:

said signal processing unit engages in, at least, either adjustment of said gain or color correction through said image processing based upon said quantity of overexposure calculated at said arithmetic operation unit.

20. An electronic camera according to claim 19, further comprising:

a data table in which processing parameters corresponding to said quantity of overexposure are stored, wherein;

said signal processing unit performs said image processing using said processing parameters read out in correspondence to said quantity of overexposure from said data table.

21. An electronic camera according to claim 19, wherein:

said signal processing unit separates an image of the background from an image of the main subject and performs color corrections individually for the background and the main subject.

* * * * *